United States Patent
Tedesco et al.

(10) Patent No.: US 7,641,036 B2
(45) Date of Patent: *Jan. 5, 2010

(54) APPARATUS, SYSTEMS AND METHODS FOR ACCEPTING PAYMENT AT A SALES DEVICE

(75) Inventors: Daniel E. Tedesco, Huntington, CT (US); Dean P. Alderucci, Westport, CT (US); James A. Jorasch, New York, NY (US); Jay S. Walker, Ridgefield, CT (US); Michael D. Downs, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/456,398

(22) Filed: Jul. 10, 2006

(65) Prior Publication Data

US 2007/0012542 A1 Jan. 18, 2007

Related U.S. Application Data

(63) Continuation of application No. 11/078,938, filed on Mar. 11, 2005, now Pat. No. 7,216,754.

(51) Int. Cl.
G07F 7/00 (2006.01)
G07D 7/00 (2006.01)

(52) U.S. Cl. ..................... 194/205; 700/237

(58) Field of Classification Search ......... 194/205–207, 194/215–217, 202, 302; 700/231, 237, 232; 73/163; 702/81, 82, 105
See application file for complete search history.

(56) References Cited

U.S. PATENT DOCUMENTS

| | | | |
|---|---|---|---|
| 4,854,247 A * | 8/1989 | Sciortino et al. | 109/1 R |
| 5,330,041 A | 7/1994 | Dobbins et al. | |
| 5,564,548 A | 10/1996 | Dobbins et al. | |
| 5,624,017 A | 4/1997 | Plesko | |
| 6,073,744 A | 6/2000 | Raterman et al. | |
| 6,516,056 B1 * | 2/2003 | Justice et al. | 379/145 |
| 6,547,131 B1 * | 4/2003 | Foodman et al. | 235/380 |
| 6,722,487 B1 * | 4/2004 | Bell | 194/302 |
| 6,830,143 B2 | 12/2004 | King | |
| 7,328,838 B2 * | 2/2008 | Brosnan et al. | 235/379 |
| 7,331,520 B2 * | 2/2008 | Silva et al. | 235/381 |
| 7,399,226 B2 * | 7/2008 | Mishra | 463/18 |
| 2004/0011622 A1 * | 1/2004 | Omori et al. | 194/230 |
| 2004/0050652 A1 * | 3/2004 | Voser | 194/302 |

OTHER PUBLICATIONS

Information brochure: "Peripherals, Module 8", Bally Gaming and Systems, Copyright 2002, 48pp.

(Continued)

*Primary Examiner*—Patrick Mackey
*Assistant Examiner*—Mark Beauchaine

(57) ABSTRACT

One embodiment of the present invention provides for a method comprising determining sales data associated with a sales device (e.g., a vending machine) and adjusting a level of sensitivity of a currency validator based on the sales data.

7 Claims, 17 Drawing Sheets

OTHER PUBLICATIONS

"BillPro Series Bill Acceptor—Installation & Operation (BP2 & BP4) Guide", CoinCo, Publication No. 925412, Nov. 2002, 2pp.

"MEI Bill Acceptor—AE2800 Installation Guide", MEI, Copyright 2003, Part No. 250052195, (www meiglobal com), 6pp.

"MEI 7512i MDB (Multi drop bus) Installation Guide", MEI, Copyright 2003, Part No. 740435001, (www meiglobal com), 6pp.

MEI Cashflow Series 7000—Quick Reference Card V 1.05), Copyright 2004, Revision G3, 2pp.

Informational Brochure: "MEI Bill Acceptor Application Program Interface", MEI, (http://www.meiglobal.com/MEIGlobal/USA/En/Products/Product/MEI_Bill_Acceptor_Application_Program_Interface_CD_ROM.htm?tab=3&industry=Generic), download date: Mar. 11, 2005, 2pp.

Office Action for U.S. Appl. No. 11/078,938, dated Jun. 26, 2006, 5pp.

Notice of Allowability for U.S. Appl. No. 11/078,938, dated Dec. 13, 2006, 1pg.

* cited by examiner

| PRODUCT IDENTIFIER 505 | PRODUCT DESCRIPTION 510 | PRODUCT CATEGORY 515 | ROW POSITION 520 | RETAIL PRICE 525 |
|---|---|---|---|---|
| P-123456789 | SNICKERS | CANDY | A1 | $0.75 |
| P-234567891 | MILKY WAY | CANDY | A2 | $0.50 |
| P-345678912 | M&MS | CANDY | A3 | $0.50 |
| P-456789123 | LAYS | CHIPS | B1 | $0.75 |
| P-567891234 | DORITOS | CHIPS | B2 | $0.50 |
| P-678912345 | CHEETOS | CHIPS | B3 | $0.75 |
| P-789123456 | SODA X | SODA | C1 | $0.65 |
| P-891234567 | SODA Y | SODA | C2 | $0.65 |
| P-912345678 | SODA Z | SODA | C3 | $1.00 |

FIG. 5A 500 (CONT.)

| MINIMUM SELLING PRICE 530 | COST 535 | ACTUAL (CURRENT) PRODUCT VELOCITY 540 | DESIRED PRODUCT VELOCITY 545 | CURRENT NUMBER IN STOCK 550 | STATUS 555 |
|---|---|---|---|---|---|
| $0.40 | $0.20 | 0.5 / DAY | 3.0 / DAY | 5 | ENABLE |
| $0.40 | $0.20 | 0 / DAY | 3.0 / DAY | 4 | ENABLE |
| $0.35 | $0.25 | 0.5 / DAY | 4.0 / DAY | 3 | ENABLE |
| $0.35 | $0.20 | 0 / DAY | 3.0 / DAY | 6 | ENABLE |
| $0.25 | $0.20 | 0.5 / DAY | 2.0 / DAY | 4 | ENABLE |
| $0.35 | $0.27 | 1.0 / DAY | 2.0 / DAY | 5 | DISABLE |
| $0.50 | $0.25 | 0.5 / DAY | 3.0 / DAY | 4 | ENABLE |
| $0.50 | $0.20 | 0 / DAY | 2.0 / DAY | 2 | ENABLE |
| $0.75 | $0.30 | 1.0 / DAY | 3.0 / DAY | 2 | DISABLE |

| TRANSACTION IDENTIFIER 605 | TRANSACTION DATE 610 | TRANSACTION TIME 615 | PRODUCT(S) PURCHASED 620 | TRANSACTION TOTAL 625 |
|---|---|---|---|---|
| T-987654321 | 3/5/2003 | 11:00 AM | A1, B3 | $1.50 |
| T-876543219 | 3/5/2003 | 11:38 AM | A3 | $0.50 |
| T-765432198 | 3/5/2003 | 2:14 PM | B2, B3 | $1.25 |
| T-654321987 | 3/6/2003 | 7:43 AM | C3 | $1.00 |
| T-543219876 | 3/6/2003 | 9:10 AM | C1 | $0.65 |
| T-432198765 | 3/6/2003 | 3:05 PM | C3 | $1.00 |

FIG. 6A 600 (CONT.)

| AMOUNT TENDERED 630 | CHANGE DISPENSED 635 | PROMOTION IDENTIFIER 640 | RESPONSE 645 |
|---|---|---|---|
| $2.00 | $0.50 | O-555-321 | ACCEPTED |
| $1.00 | $0.50 | O-444-210 | ACCEPTED |
| $2.50 | $0.75 | O-333-109 | REJECTED |
| $1.00 | $0 | O-222-098 | ACCEPTED |
| $1.00 | $0.35 | N/A | N/A |
| $1.00 | $0 | O-000-876<br>O-999-765 | REJECTED<br>ACCEPTED |

FIG. 6B

| VALIDATION IDENTIFIER 705 | VALIDATION DATE 710 | VALIDATION TIME 715 | ITEM STATUS 720 | ITEM VALUE 725 | ACCEPTED ITEM 730 | ACTION TAKEN 735 | TRANSACTION IDENTIFIER 740 |
|---|---|---|---|---|---|---|---|
| V-100 | 3/6/2003 | 11:00 AM | VALID | $5 | YES | N/A | T-987456321 |
| V-101 | 3/6/2003 | 11:38 AM | INVALID | N/A | NO | RETURN | N/A |
| V-102 | 3/6/2003 | 2:14 PM | SUSPECT | $1 | YES | INCREASE ACCEPTANCE | T-456654321 |
| V-103 | 3/7/2003 | 7:43 AM | SUSPECT | $1 | YES | HIGH MARGIN OFFER | T-987654456 |
| V-104 | 3/7/2003 | 9:10 AM | INVALID | N/A | NO | INCREASE SECURITY | N/A |
| V-105 | 3/8/2003 | 9:27 AM | SUSPECT | N/A | NO | ALTERNATE CURRENCY PROMPT | N/A |
| V-106 | 3/9/2003 | 4:08 PM | SUSPECT | $5 | NO | ADDITIONAL INFO. PROMPT | N/A |

FIG. 7

| ACTION IDENTIFIER 805 | ACTION TYPE 810 | CONDITION(S) FOR ACTION 815 | ACTION DESCRIPTION 820 |
|---|---|---|---|
| A-70-440 | INCREASE SECURITY | INVENTORY OF ALL SNACK PRODUCTS PROJECTED AS < 8 BY END OF FILL PERIOD | SET BILL VALIDATOR TO HIGH SECURITY MODE |
| A-80-662 | DECREASE SECURITY | NET PROFIT FOR CURRENT FILL PERIOD < $70 | INCREASE ACCEPTABLE PARAMETER RANGES FOR ALL BILL DENOMINATIONS |
| A-90-293 | DYNAMIC PRICE UPSELL OFFER | $5 BILL PRESENTED AND CHANGE IS DUE CUSTOMER | GET SNACK W FOR YOUR SPARE CHANGE! |
| A-10-321 | DISABLE PRODUCT(S) | CURRENCY IS SUSPECT AND PROFIT MARGIN OF ITEM X NOT < $0.30 | DISABLE ITEM X |
| A-30-528 | DISABLE OFFER(S) | CURRENCY IS SUSPECT AND CHANGE IS DUE CUSTOMER | DISABLE UPSELL OFFERS FOR CURRENT CUSTOMER |
| A-40-232 | ALTERNATE CURRENCY PROMPT | CURRENCY IS SUSPECT AND NUMBER OF TRANSACTIONS FOR CURRENT CUSTOMER < 3 | PROMPT CUSTOMER TO INPUT DIFFERENT CURRENCY ITEM |
| A-50-227 | ADDITIONAL INFORMATION PROMPT | $20 PRESENTED AND NUMBER OF TRANSACTIONS FOR CURRENT CUSTOMER < 3 | REQUEST INFORMATION ABOUT DIFFERENT PAYMENT MEANS TO SECURE TRANSACTION |
| A-60-329 | ADDITIONAL INFORMATION PROMPT | CURRENCY IS SUSPECT AND CREDIT CARD ACCOUNT NUMBER NOT ON FILE | REQUEST DRIVER'S LICENSE NUMBER OR CREDIT CARD ACCOUNT NUMBER |

FIG. 8

| CONDITION 905 | ELIGIBLE ACTION TYPE(S) 910 |
|---|---|
| TOTAL REVENUE RECEIVED IN CURRENT FILL PERIOD IS LESS THAN $100 | DECREASE SECURITY |
| NUMBER OF $5 PRESENTMENTS IN CURRENT FILL PERIOD IS GREATER THAN 150 | DECREASE SECURITY |
| INVENTORY OF EACH OF AT LEAST 2 PRODUCTS PROJECTED TO BE LESS THAN 3 BY END OF FILL PERIOD | INCREASE SECURITY |
| SALES VELOCITY OF PRODUCT Y IS LESS THAN 1 PER WEEK | DECREASE SECURITY; DYNAMIC UPSELL OFFER |
| NUMBER OF FRAUDULENT $20 BILLS IN REGION AAA IS GREATER THAN 25 | INCREASE SECURITY; ADDITIONAL INFORMATION PROMPT; ALTERNATE CURRENCY PROMPT |
| FIRST ITEM OF CURRENCY PRESENTED BY CUSTOMER IS REJECTED AND SECOND ITEM OF CURRENCY PRESENTED BY CUSTOMER IS VALID | DECREASE SECURITY |
| CURRENCY IS SUSPECT | ADDITIONAL INFORMATION PROMPT; DISABLE PRODUCT(S); DISABLE OFFER(S); RISK PREMIUM; ALTERNATE CURRENCY PROMPT; DYNAMIC UPSELL OFFER |

FIG. 9

APPARATUS, SYSTEMS AND METHODS FOR ACCEPTING PAYMENT AT A SALES DEVICE

CROSS-REFERENCE TO RELATED APPLICATIONS

The present application is a continuation of U.S. patent application Ser. No. 11/078,938, filed Mar. 11, 2005, U.S. Pat. No. 7,216,754 entitled "APPARATUS, SYSTEMS AND METHODS FOR ACCEPTING PAYMENT AT A SALES DEVICE", which is incorporated by reference herein in its entirety.

This application is related to the following commonly-owned U.S. patent applications:

a) U.S. patent application Ser. No. 09/345,092 entitled "Vending Machine System And Method For Encouraging The Purchase Of Profitable Items", filed Jun. 30, 1999;
b) U.S. patent application Ser. No. 10/855,247 entitled "Method And Apparatus For Managing Vending Machine Offers", filed May 27, 2004;
c) International Patent Application Serial No. PCT/US2004/025497 entitled "Products and Processes for Vending A Plurality Of Products Via Defined Groups", filed Jul. 30, 2004; and
d) U.S. patent application Ser. No. 10/951,296 entitled "Method And Apparatus For Defining and Utilizing Product Location In A Vending Machine", filed Sep. 27, 2004.

The entirety of each of the above applications is incorporated by reference herein for all purposes.

BRIEF DESCRIPTION OF THE FIGURES

Various embodiments of the present invention are described herein with reference to the accompanying drawings:

FIGS. 5A and 5B are a table illustrating an example data structure of an example product inventory database for use in some embodiments of the present invention;

FIGS. 6A and 6B are a table illustrating an example data structure of an example transaction history database for use in some embodiments of the present invention;

FIG. 7 is a table illustrating an example data structure of an example validation history database for use in some embodiments of the present invention;

FIG. 8 is a table illustrating an example data structure of an example actions database for use in some embodiments of the present invention;

FIG. 9 is a table illustrating an example data structure of an example rules database for use in some embodiments of the present invention;

DETAILED DESCRIPTION

Figure 1:
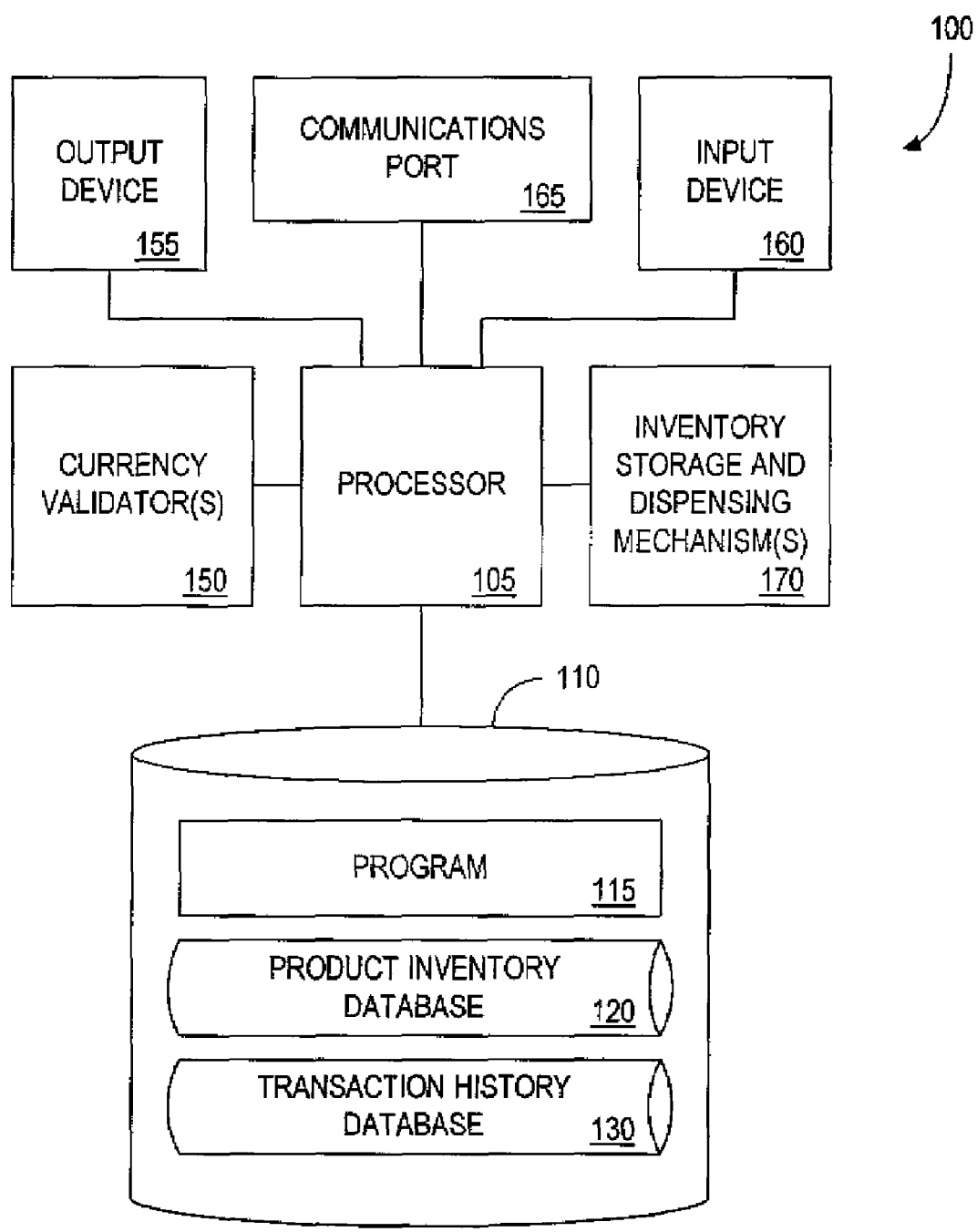
FIG. 1 is a block diagram of an embodiment of a vending machine consistent with some embodiments of the present invention.

An ongoing need exists for systems and methods for determining whether to accept a tendered deposit or payment (e.g., currency; a credit card payment) at a transaction device in a beneficial manner (e.g., in a manner that increases overall profit). If a device for validating a tendered payment (e.g., currency) at a sales device is set at a level that is too sensitive and/or improperly calibrated, for example, there is a risk that the sales device may lose a potential sale by erroneously turning away a customer who presents legitimate payment (e.g., currency) that is rejected, a risk that the customer may not return to the sales device, and a risk that the rejected customer may suggest to others that they avoid the sales device.

Applicants have recognized that it would be advantageous to determine and/or adjust one or more protocols for processing transactions based on any of various types of information, including, for example: customer information, currency validation information, historical sales data, product information (e.g., price, profit margin), demand information, and/or time information. Such determinations and adjustments of transaction protocols may be performed, for example, dynamically, at random times, periodically, and/or according to a schedule. Protocols useful in facilitating transactions may include, by way of example and without limitation, processes related to promotion, processes for providing (e.g., dispensing) of products and/or services, processes related to validation of payment or payment means (e.g., credit card accounts), processes related to pricing adjustment(s), and processes related to storing and/or reporting of sales information. Various other types of protocols (and combinations of protocols) that may be practical for particular applications will be readily understood by those skilled in the art in light of the present disclosure. It will be understood that such protocols may include any number of routines, algorithms, and/or processes.

Applicants have also recognized that it would be advantageous, in accordance with one or more embodiments, to adjust (e.g., dynamically) security or sensitivity levels of a currency validator, based on any of various types of information, including, for example: customer information, currency validation information, historical sales data, demand information, and/or time information.

Applicants have also recognized that it would be advantageous, in accordance with some embodiments, to provide for apparatus and methods for determining whether to accept one or more tendered payments (e.g., items of currency) based on various types of information, including, for example: customer information, currency validation information, historical sales data, demand information, and/or time information.

Applicants have further recognized that it would be advantageous, in accordance with some embodiments, to provide for methods and apparatus for processing transactions (such as by validating currency) that (i) receive any of various types of transaction or sales information (e.g., demand information, historical sales data), (ii) determine (e.g., dynamically) one or more actions based on such information, and/or (iii) respond (e.g., dynamically) to such information.

Applicants have also recognized that it would be advantageous, in accordance with some embodiments, to provide for a currency validator that receives and/or stores information such as, for example, sales, inventory, customer, and/or transaction information.

Applicants have also recognized that it would be advantageous, in accordance with some embodiments, to provide for apparatus and methods by which a determination of whether to accept an item of currency as payment is not based solely on physical characteristics of the currency. Applicants have further recognized that it would be advantageous, in accordance with some embodiments, to provide for apparatus and methods by which a determination of whether to accept an item of currency as payment is based at least in part on information such as, for example, sales, inventory, customer, and/or transaction information.

Applicants have also recognized that if transaction devices, such as automated sales devices, could capitalize on "failed demand" (e.g., where legitimate currency is erroneously rejected), owners and/or operators of such devices could realize greater revenue potential. Some types of customers would also find it beneficial to avoid the disappointment of having their currency rejected at a sales device.

Applicants have recognized that, in some situations, it may be advantageous to accept an item of currency presented at a transaction device (e.g., a vending machine), even if a currency validator (or other means for authenticating currency) indicates or determines that the item is not or might not be authentic.

Applicants have further recognized that, in some situations, acceptance of what might be an invalid or suspect item of currency as payment may be utilized to manage the profitability of a vending machine or other sales device.

Applicants have recognized that, in some situations, taking into account certain information when determining whether to accept an item of currency as payment may aid in the management of the profitability of a sales device. Such information may comprise, for example, information regarding a current inventory of a vending machine, demand data, information about profit margin(s) for one or more products, revenue information, an expected restocking of the vending machine, a current bill or coin inventory of the vending machine, validation history, at least one transaction previously completed at the vending machine, and/or a transaction currently initiated at the vending machine.

Applicants have also recognized that, in some situations, taking into account certain information related to and/or provided by a customer, when determining (i) whether to accept an item of currency and/or (ii) whether to adjust one or more settings of a currency validator, may aid in the management of the profitability of a sales device. Such information may comprise, for example, an identifier that identifies the customer (e.g., a driver's license number, a credit card number, an account identifier that identifies an account or subscription of the customer (such as for use in making purchases at a vending machine or other sales device), a player tracking card number), at least one transaction previously completed with the customer, at least one item of currency previously presented by the customer, at least one item of currency previously accepted from the customer, an additional or alternative means of payment (e.g., a financial account number), a product indicated by the customer, and/or a transaction with the customer currently initiated at a vending machine.

Applicants have further recognized that, in some situations, even if an item of currency is determined (e.g., by a currency validator) to be suspect, invalid or not identifiable, various actions may be taken to manage the profitability of a sales device by attempting to minimize or otherwise manage the risk of accepting the potentially invalid currency. Such actions may comprise, for example, increasing the price of one or more products, making one or more products unavailable for purchase (e.g., products with relatively lower profit margins), requiring a customer to purchase at least a predetermined minimum number of products, requiring a customer to make a purchase having at least a predetermined total price, offering an alternative product to a customer, deciding not to display an offer to a customer (e.g., an upsell offer), adjusting one or more acceptance settings of a currency validator, and/or requesting that a customer secure a transaction (e.g., indicate an additional or alternative means of payment in case it is later confirmed that the currency is counterfeit).

Applicants have yet further recognized that, in some situations, multiple such actions may be possible and thus it can be beneficial to have software operable to select which, if any, of the possible actions to take. Such software may, for example, enable an efficient process for selecting the operation that is likely to result in the most profit for a vending machine and/or the offer that is most likely to be accepted by a customer of a sales device.

With these and other advantages and features of the various embodiments of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense.

According to an embodiment of the present invention, sales information for a vending machine is determined. A currency acceptance or validation setting is adjusted based on the sales information.

For example, a peripheral device and/or controller associated with a vending machine may determine, based on current inventory and a rate at which each of the products available from the vending machine has been selling, that it may be desirable to decrease the sensitivity of a currency validator in order to reduce the likelihood that valid currency will be rejected. Increasing the likelihood of currency acceptance may potentially prevent customer frustration with rejected currency, and may potentially increase the profits of the vending machine for a current sales period by allowing more sales. Accordingly, the peripheral device and/or controller may determine that it would be beneficial to (i) switch a currency validator to a "high acceptance" mode and/or (ii) accept an item of currency that is suspect (e.g., that might be invalid).

In addition, a peripheral device and/or controller may determine that it would be beneficial to either (i) promote a slow-selling or higher profit product as an alternate product to a product selected by a customer or (ii) offer a slow-selling or higher profit margin product in a package along with a popular product, for a package price that is less than the sum of the retail prices of the popular product and the other product. Such promotions may be useful in some embodiments for managing the risk associated with lowering security settings or accepting potentially invalid currency, for example, by directing customers toward slow-selling products or products with higher profit margins. A peripheral device, for instance, may select one of these possible promotions by, for example, calculating an expected value for each (e.g., based on a profit margin and the probability of a currency item being invalid) and selecting the one with the highest expected value. Assuming the package promotion is associated with the higher expected value, the peripheral device may output, via an output device of the peripheral device, a promotion informing customers of the vending machine that the slow-selling product and the popular product are available for a package price. Alternatively, the peripheral device may direct a processor of the vending machine to cause an output device of the vending machine to output the promotion.

Apparatus and methods for determining, constructing, and/or outputting promotions and other messages suitable with one or more embodiments of the present invention are described, among other things, in U.S. patent application Ser. No. 10/855,247, entitled "Method And Apparatus For Managing Vending Machine Offers," and incorporated by reference herein. Some examples of systems and methods for constructing, offering and processing alternate product promotions at vending machines and consistent with one or more embodiments of the present invention are described (among other things) in detail in Applicant's co-pending U.S. patent application Ser. No. 09/345,092 entitled "Vending Machine System And Method For Encouraging The Purchase Of Profitable Items," the entirety of which is incorporated by reference herein for all purposes.

According to another embodiment of the present invention, an occurrence of a predetermined or predefined event may be determined. An action may be determined in response to the determination of the occurrence of the predetermined event. In one example, an action may comprise a prompt to the customer to provide information such as, for example, a driver's license number or other type of identification, or a financial account identifier or other means of securing a transaction (e.g., in case a suspect item of currency is later confirmed to be fraudulent). In another example, a promotion may be constructed. The instance of the promotion may comprise, for example, an offer distinct from a general offer to sell products from a vending machine at posted prices. The instance of the promotion may be constructed based on one or more of (i) information related to currency validation (e.g., rejection/acceptance of an item of currency, acceptance setting(s) of a currency validator), (ii) data associated with transactions completed at a vending machine and/or data associated with a transaction currently initiated at the vending machine, and (iii) a predetermined goal stored in a memory. The instance of the promotion may then be output via an output device of the sales device (e.g., a vending machine, a slot machine or other gaming device).

In accordance with some embodiments, apparatus, systems and methods are disclosed for managing the profitability of a vending machine by determining actions based on an evaluation of sales data in light of criteria including but not limited to stored, or dynamically generated, rules.

According to one embodiment of the present invention, sales and/or cost data is monitored and compared to a profit goal. If a forecast based on the sales and/or cost data indicates that the profit goal will likely not be reached within a predefined period (e.g., by a restock date), a determination is made as to which of two or more possible validation settings or sensitivity levels may be appropriate for the circumstances based on stored rules. Various types of validation settings are disclosed herein, including (i) a setting associated with increased currency acceptance relative to one or more other available settings (e.g., a "high acceptance" setting), (ii) a setting associated with decreased currency acceptance relative to one or more other available settings (e.g., a "high security" setting), (iii) acceptable denomination types, and (iv) measurement criteria or other types of stored parameters for comparison with sensed characteristics of presented currency. A respective expected profit may be calculated (or otherwise determined) for each potential validation setting (or combination of settings), and may be calculated for each current validation setting (or combination of settings). According to the relative expected profitability of the respective validation setting(s), one setting or combination of settings is selected and, if necessary, settings of one or more currency validators are updated accordingly.

In some embodiments, the determination of whether particular (e.g., current and/or potential) validation settings are appropriate is made periodically, according to a predetermined schedule, or substantially continuously, so that adjustments can be made between transactions and/or interactions with customers. In other embodiments, the determination of whether a validation setting is appropriate is made following the initiation of a transaction by a customer and/or following presentation of an item of currency by a customer.

Thus, utilizing one or more embodiments of the present invention, a sales device's profit-per-fill period (or other type of time period) may be increased. Specifically, rules for determining appropriate validation settings, determining whether to accept an item of currency as payment, determining appropriate actions to take based on currency validation and/or transaction data, constructing hypothetical promotion instances, and/or selecting a promotion from several hypothetical promotion instances are designed to, in some embodiments, increase sales volume/velocity while managing the risk of accepting invalid currency.

According to one embodiment of the present invention, a currency validator receives sales data, demand data, transaction data, and/or inventory data (e.g., from a vending machine controller, from a peripheral device).

According to an embodiment of the present invention, a currency validator (e.g., of a vending machine) determines whether to accept a presented item of currency as payment based on sales data, demand data, transaction data, and/or inventory data. According to an embodiment of the present invention, it is determined whether to adjust one or more settings of a currency validator based on sales data, demand data, transaction data, and/or inventory data.

According to one embodiment of the present invention, an item of currency received at a sales device fails at least one condition for validity. The sales device accepts the item of currency as payment.

According to one or more embodiments of the present invention, an item of currency is received at a vending machine and the item of currency is determined to be invalid, suspect and/or unacceptable based on one or more characteristics of the item. The vending machine accepts the item of currency as payment.

According to an embodiment of the present invention, a currency validator determines that an item of currency is suspect or unacceptable based on one or more physical characteristics. Based on information that is not related to physical characteristics of the item of currency, the item of currency is accepted as payment.

In accordance with some embodiments, apparatus, systems and methods are disclosed for managing the profitability of a vending machine by accepting an item of currency based on an evaluation of sales and/or inventory data in light of criteria including but not limited to stored, or dynamically generated, rules.

According to one embodiment of the present invention, sales and/or cost data is monitored and compared to a profit goal. If a forecast based on the sales and/or cost data indicates that the profit goal will likely not be reached within a predefined period (e.g., by a restock date), a determination is made as to whether an item of currency should be accepted based on stored rules.

Numerous embodiments are described in this application, and are presented for illustrative purposes only. The described embodiments are not intended to be limiting in any sense. The invention is widely applicable to numerous embodiments, as is readily apparent from the disclosure herein. Thus, although the title of this application and its abstract may provide simple descriptions of one or more embodiments of the present invention, those descriptions are not intended to be limiting in any sense. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, for example, appropriately programmed general purpose computers or computing devices. Further, programs that implement such methods and algorithms may be stored and transmitted using a variety of known media.

When a single device or article is described herein, it will be readily-apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing instructions that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable-media may be involved in carrying a sequence of instructions to a processor.

Various embodiments of the present invention are described herein with reference to the accompanying drawings. The leftmost digit(s) of a reference numeral typically identifies the figure in which the reference numeral first appears.

As will be understood by those skilled in the art, any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A. DEFINITIONS

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The term "actual product velocity" may refer to an actual rate at which a given product is sold by a sales device (e.g., vending machine) during a particular period of time (e.g., during a sales period).

The term "control system" may refer to hardware, software, or a combination of hardware and software, operative to carry out one or more methods of the present invention. For example, a control system may comprise a processor performing instructions of a program.

The term "payment validator" may refer to hardware, software or a combination thereof operative to, among other things, (i) receive an indication of a tendered payment, such as an item of currency or a financial account number (e.g., credit card account number), (ii) initiate or otherwise facilitate an evaluation of the tendered payment, such as by measuring characteristics of an item of currency or by determining the status of a financial account, and (iii) execute an action based on the evaluation, such as by rejecting or accepting an item of currency, or by outputting a signal indicative of the status of a financial account. In some embodiments, as discussed herein, a payment validator may comprise one or more currency validators. In one or more embodiments, a payment validator may comprise one or more of a bill validator, a coin acceptor, a magnetic stripe card reader and/or associated computers, a cash register, and/or other device(s). Further, in one or more embodiments, a currency validator or other type of payment validator may comprise and/or communicate with a transaction device, such as a vending machine. Although reference is made variously herein to the validation of payment or means for payment (e.g., a credit card account number), various embodiments of the present invention may be applicable generally to processes related to the validation and/or authorization for any amount of funds or credit (or means for providing such funds), whether or not any portion of that amount is specifically designated for payment (e.g., as for a purchase). For example, some of the methods and systems described herein may be applicable to the validation of an item of currency, a casino token, a Paypal™ account identifier, or a credit card account number, provided to establish a balance of credit or other account that a customer may or may not ever use as payment.

The terms "dynamically priced upsell promotion", "dynamic priced upsell promotion", "roundup deal", "roundup promotion", and "spare-change upsell promotion" shall be synonymous and may refer to a promotion to a customer of a first product for the purchase of an additional product in exchange for an additional amount that is equal to an amount of change due back to the customer as a result of the customer's purchase of the first product.

The terms "fill period" and "sales period" shall be synonymous and may refer to the period of time between restocking events at a sales devices such as a vending machine.

The terms "full price" and "retail price" shall be synonymous and may refer to the normal price charged for the purchase of a given product. Typically, promotions present customers with the opportunity to purchase products at less than full price.

The terms "ideal product velocity", "target product velocity", and "target velocity" shall be synonymous and may refer to the desired rate at which a given product should be sold by a sales device during a period of time (e.g., during a sales period). Thus, in some embodiments, an ideal velocity may be set or calculated for each product indicating the rate at which products must be sold in order to deplete the inventory to a certain level by the end of a given sales period (e.g., by the next restocking event at a vending machine). For example, an ideal product velocity may be calculated by a vending machine control system after an operator inputs a restock date and a desired remaining inventory for the date. For example, an operator may wish to have only one of each product remaining at the next restocking event so that the vending machine sells as many products as possible without completely selling out and thereby disappointing customers. Thus, in the preceding example, if an operator (a) stocks fifty units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to realize the ideal product velocity.

As discussed herein, a vending machine or other device may periodically, substantially continuously, or otherwise determine whether or not actual product velocity is at least equal to the ideal product velocity, and if not, may institute promotions or take other actions (e.g., decreasing the sensitivity of a bill validator) as discussed herein. An ideal product velocity may be further set so that if such a velocity is reached, the increase in volume will sufficiently offset any projected loss due to acceptance of fraudulent currency.

The term "input device" may refer to a device that is used to receive an input. An input device may communicate with or be part of another device (e.g., a point of sale terminal, a point of display terminal, a customer terminal, a server, a customer device, a vending machine, a controller, a peripheral device, etc.). Some examples of input devices include: a bar-code scanner, a magnetic stripe reader, a computer keyboard, a point-of-sale (POS) terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g., a vending machine, a point of sale terminal, a point of display terminal, a customer device, a controller, etc.). Possible output devices include: a cathode ray tube (CRT) monitor, liquid crystal display (LCD) screen, light emitting diode (LED) screen, a printer, an audio speaker, an infrared transmitter, and a radio transmitter.

The term "minimum selling price" may refer to the lowest price at which a product may be sold. The minimum selling price may not necessarily reflect the cost of the product to the operator of a sales device. Thus, the minimum selling price may include an acceptable profit margin. Conversely, the minimum selling price may be set less than the cost of a product to the operator of a sales device, as may be the case where a promotion or series of promotions would sufficiently offset any loss associated with selling the particular product below cost.

The term "operator" may refer to the owner of a sales device, or agent or associate thereof (e.g., a route driver or lessee of a vending machine).

The terms "package deal", "combination deal", "package promotion", "combination promotion", "combination product promotion", "Load-up' deal", "value combo deal", and "combo deal" shall be synonymous and may refer to a promotion enabling a customer to purchase at least two products for a single price. In one or more embodiments, package promotions are configured to result in a benefit (e.g., netsavings) to the customer when compared to the sum of the individual component produces retail prices.

The term "peripheral device" may refer to any device associated with one or more transaction devices, the peripheral device being operable to perform any of the functions described herein. For example, in one embodiment, a vending machine may be retrofitted with a peripheral device that comprises a processor, memory, and output device for accepting/rejecting currency in accordance with one or more embodiments of the present invention. A peripheral device may or may not be attached to a transaction device. A peripheral device may or may not be operable to direct the associated transaction device to perform certain functions. A peripheral device, or portions thereof, may be housed inside the casing of the associated transaction device. Further, a peripheral device may be operable to detect one or more events at a transaction device. For example, a peripheral device may be operable to detect one or more signals output by a processor of a transaction device. Further still, a peripheral device may be operable to communicate with a processor of an associated transaction device.

The terms "product," "good," "item", "merchandise," and "service" shall be synonymous and may refer to anything licensed, leased, sold, available for sale, available for lease, available for licensing, and/or offered or presented for sale, lease, or licensing including individual products, packages of products, subscriptions to products, contracts, information, services, and intangibles. Examples of goods sold at vending machines include beverages (e.g., cans of soda) and snacks (e.g., candy bars). Examples of services sold by vending machines include car washes, photography services and access to digital content (e.g., permitting the downloading of MP3 files or "ring tones" to a handheld device).

The term "profit inventory management" or "PIM" may refer to the practice of managing the sale of products so as to increase a sales device's profitability during a period of time (e.g., during a sales period). In some embodiments, a sales device is programmed to evaluate sales data in light of stored rules indicative of a profit goal. For example, stored rules may indicate an ideal product velocity that would tend to increase the machine's profitability. The machine may determine that, based on current sales data, the ideal product velocity (for a given product or group of products) will not be achieved based on current promotions, prices, or other sales parameters. In response, the transaction device may execute multi-variant equations to identify, construct and offer a promotion to a customer with the goal of achieving the ideal product velocity (for a given product or group of products).

The term "promotion instance" may refer to an instance of a potential or hypothetical promotion that may be output (e.g., to a particular customer). A promotion instance may be constructed and compared to other potential or hypothetical promotion instances for the purpose of determining which one or more promotions will be presented to a customer for acceptance. In one or more embodiments, promotion instances are constructed by populating promotion types with data representing inventory in a sales device.

The term "promotion type" may refer to the form, format or category of a promotion, as distinguished from the products and/or prices that may be included in a promotion. For example, the form of an promotion may be a "dynamically priced upsell", meaning that a particular product will be offered to a customer in exchange for the customer's change due from a first, triggering transaction. Thus, one dynamically priced upsell promotion may include Product A, whereas another such promotion may include Product B, but both promotions may be of the "dynamically priced upsell" promotion type.

The term "promotion" may refer to a message that is output, regarding some product, distinct from a general offer to sell products from a sales device at retail prices. For example, a promotion may comprise a message intended to increase machine profitability. Typically, a promotion allows customers to purchase one or more products under terms that are generally more favorable to the customer than standard retail terms (e.g., at prices less than or equal to the corresponding product's full price(s), but greater than or equal to the corresponding product's minimum price(s)).

The terms "restock date", "restock time", "restock event" and "pick-up" shall be synonymous and may refer to the time and/or date that a sales device is scheduled to be restocked by an operator.

The terms "server" and "controller" shall be synonymous and may refer to any device(s) that may communicate with one or more transaction devices, one or more third-party servers, one or more remote controllers, one or more customer devices, one or more peripheral devices and/or other network nodes, and may be capable of relaying communications to and from each.

The terms "target profit" and "ideal profit" may be used interchangeably and may refer to a desired profit to be achieved by a transaction device or group of transaction devices. In some embodiments, an operator of a vending machine may set the profit goal.

The scope of the present invention and embodiments thereof may be understood more fully with reference to the following figures. Embodiments of the present invention are first described by means of block diagrams illustrating exemplary system infrastructure and devices that may be utilized by an entity practicing the present invention. Exemplary data structures illustrating tables that may be used when practicing embodiments of the present invention are then described. Finally, flow diagrams that illustrate exemplary processes consistent with some embodiments of the present invention are described.

B. SYSTEMS AND APPARATUS

Generally, a transaction device in accordance with one embodiment of the present invention may comprise a device, or communicate with a device (e.g., a server, a peripheral device, and/or a peripheral device server), which is configured to manage transactions with users by receiving payment from customers (e.g., at a sales device); receiving, dispensing and/or exchanging currency (e.g., at an ATM); communicating product information to customers; validating currency and/or payments presented by users; controlling the pricing and/or distribution of goods; and/or controlling entitlements to services. Example transaction devices include, but are not limited to: vending machines, juke boxes, gaming machines (e.g., slot machines; video poker machines), ATMs, cash registers and POS terminals.

Generally, as described herein, a transaction device in accordance with one embodiment of the present invention may comprise a device, or communicate with a device (e.g., a server, a peripheral device, and/or a peripheral device server), which is configured to process transactions, such as by validating currency presented by a user (and/or manage such validation). For example, a vending machine in accordance with some embodiments of the present invention may include a bill validator for authenticating bills received from a customer. In another example, a transaction device may include a credit or debit card reader, which may communicate with another device to process transactions by requesting and obtaining authorizations for payment.

Referring now to FIG. 1, illustrated therein is a block diagram of an embodiment of a system consistent with the present invention. More specifically, FIG. 1 is a block diagram of an exemplary transaction device, vending machine 100, that may be operable to perform one or more functions described herein.

The vending machine 100 may include a processor 105, such as one or more Intel® Pentium® or Centrino™ processors. The processor 105 (herein, "processor," "processor 105", "computer" or "control system") may include or be coupled to one or more docks or timers (not pictured) and to one or more communication ports 165 through which the processor 105 may communicate, in accordance with some embodiments, with other devices. Such other devices may include, without limitation, one or more peripheral device servers, one or more servers, one or more peripheral devices, one or more transaction devices, one or more payment validators, and/or one or more user devices. In one or more embodiments, a communication port 165 may comprise a modem (e.g., a cellular modem or otherwise), and/or a wireless transmitter or transponder (e.g., an infrared transmitter/receiver, a radio transmitter/receiver).

The example processor 105 is also in communication with a data storage device 110. The data storage device 110 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 105 and the data storage device 110 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments, for example, the vending machine 100 may comprise one or more computers (or processors 105) that are connected to a remote server computer operative to maintain databases, where the data storage device 110 is comprised of the combination of the remote server computer and the associated databases.

The data storage device 110 stores a program 115 for controlling the processor 105. The processor 105 performs instructions of the program 115, and may thereby operate in accordance with various embodiments of the present invention, and particularly in accordance with one or more of the methods described in detail herein. The present invention may be embodied as a computer program 115 developed using an object-oriented language that allows the modeling of complex systems with modular objects to create abstractions that are representative of real world, physical objects and their interrelationships. However, it would be understood by one of ordinary skill in the art that the invention as described herein could be implemented in many different ways, using a wide range of programming techniques, as well as through the use of general-purpose hardware systems and/or dedicated controllers.

The program 115 may be stored in a compressed, uncompiled and/or encrypted format. The program 115 furthermore may include program elements that may be generally useful, such as an operating system, a database management system and device drivers for allowing the processor 105 to interface with computer peripheral devices. Appropriate general purpose program elements are known to those skilled in the art, and need not be described in detail herein.

Further, the program 115 is operative to execute a number of objects, modules and/or subroutines specific to one or more embodiments of the present invention.

According to some embodiments of the present invention, the instructions of the program 115 may be read into a main memory of the processor 105 from another computer-readable medium, such as from a ROM to a RAM. According to some embodiments, some or all of the instructions of the program 115 may be updated, for example, by replacement of a ROM (e.g., an EPROM) and/or download (e.g., from a server or an operator device).

In some embodiments, execution of sequences of the instructions in the program 115 causes processor 105 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 115, the data storage device 110 is also operative to store one or more databases, such as (i) a product inventory database 120 and (ii) a transaction history database 130. The databases 120 and 130 are described in detail below and example structures are depicted with sample entries in the accompanying figures. Optionally, the data storage device 110 may be operative to store one or more rules databases.

Vending machine 100 may comprise currency validator(s) 150. Many types of transaction devices utilize currency validators to protect against fraud (e.g., counterfeit bills) and machine malfunctions (e.g., jams). As will be readily understood by those skilled in the art, a currency validator typically senses or measures one or more characteristics of a presented item of currency and compares the measurement(s) against acceptable values or ranges to determine whether to accept the currency.

The currency validator(s) 150 may comprise one or more mechanisms for receiving payment and/or dispensing change. Such mechanisms may include, without limitation, a coin acceptor, a token acceptor, a bill validator, a coupon or voucher reader, and/or a change dispenser. The currency validator(s) 150 may comprise a serial, parallel or multi-drop bus (MDB) interface for communicating with the processor 105. As will be readily understood by those skilled in the art, currency validators (also referred to herein as currency acceptors) may receive and validate currency. Validated currency may be stored by a "hopper" or other type of currency storage apparatus (not shown) that is in communication with a currency validator. Some types of currency validators may comprise one or more currency storage apparatus (e.g., a magazine, a cassette, a stacker box). Various types of currency validators are discussed further herein with respect to FIG. 3.

Various functionalities consistent with one or more embodiments of the present invention may be provided by the processor 105, the currency validator(s) 150, and any combination thereof. In some embodiments, the processor 105 and the currency validator(s) 150 may communicate to provide for various functions consistent with one or more embodiments of the present invention. For example, the processor 105 may be operable (e.g., in accordance with instructions of the program 115) to perform one or more of the following: transmitting a signal to enable/disable the currency validator(s); enabling/disabling individual denominations to be accepted; prompting for and/or receiving a status of the currency validator(s) (e.g., ready, $5 bill received, error); returning an item of currency; rejecting an item of currency; accepting an item of currency; calibrating a currency validator; and/or transmitting new or updated software to the currency validator(s). In some embodiments, the currency validator(s) 150 may be operable to provide for enabling/disabling of currency acceptance, determining whether to return, reject, and/or accept an item of currency, self-calibration, etc., without instruction from the processor 105.

In addition to currency validator(s) 150, vending machine 100 optionally may comprise one or more other types of payment processing mechanism(s) or payment validator(s) (not shown). Such mechanisms may comprise one or more alternative mechanisms for receiving payment, verifying payment means (e.g., verifying a credit card account number is valid), authorizing (or receiving an indication of an authorization of) a means of payment (e.g., authorizing a charge to a credit card account), and/or dispensing change. Such alternative mechanisms may include, without limitation, a card reader (e.g., a magnetic stripe reader) and/or a ticket in/out device (e.g., for reading and/or printing tickets or vouchers).

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc., of Malvern, Pa.

In another embodiment, a vending machine in accordance with one or more embodiments of the present invention may be configured to receive payment authorization and product selection commands through a wireless device communication network, directly or indirectly, from a customer device (e.g., a cellular telephone). In such an embodiment, a payment processing mechanism may comprise a cellular transceiver operatively connected to a processor, as described herein. Systems and methods allowing for the selection of and payment for vending machine articles through cellular telephones are provided by USA Technologies, Inc. Further, in such an embodiment, a customer cellular telephone may serve as an input/output device, as described herein.

Further details concerning currency validators and payment processing mechanisms suitable for use with a vending machine or other types of transaction devices are well known in the art, and need not be described in further detail herein.

The vending machine 100 may further comprise an output device 155 and an input device 160. It should be understood that, although only a single output device 155 and a single input device 160 are illustrated in FIG. 1, any number of output devices and/or input devices might be used.

In accordance with some embodiments of the present invention, a vending machine may include an input device for receiving input from a customer, operator, or other person. Also, a vending machine may include one or more output devices for outputting product and/or other information to a customer or operator.

Many combinations of input and output devices may be employed as appropriate in accordance with embodiments of the present invention. For example, in embodiments that feature touch screens (described herein), a single device may provide input and output functionality.

As described, a vending machine may include more than one input device. For example, a vending machine may include an exterior input device for receiving customer input and an interior input device (e.g., not accessible by a customer) for receiving operator input. In some embodiments, however, the input device provides the dual functionality of receiving input data from both operators and customers.

As also described, a vending machine may comprise more than one output device. For example, a vending machine may include both a LCD screen and one or more LEDs. Output device 155 may comprise, for example, an LCD and/or one or more LED displays (e.g., several alphanumeric LEDs on the shelves of a vending machine, each LED being associated with a row of product inventory).

In one embodiment, an LED display screen may be mounted to a vending machine (e.g., attached thereto, such as via bolts or other mounting hardware). A mounted LED display screen may be used to communicate messages (e.g., product information) to customers. A suitable LED display screen for such an embodiment may be housed in an aluminum case having a length of 27.5", a height of 4.25", and a depth of 1.75." Such a display screen may have a display area capable of showing thirteen alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, and green).

Further, in some embodiments, an output device comprises a printer. In one embodiment, a printer is configured to print on card stock paper (e.g., 0.06 mm to 0.15 mm thickness), such as the EPSON EU-T400 Series Kiosk Printer. Further, a printer may be capable of thermal line printing of various alphanumeric and graphical symbols in various font sizes (e.g., raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly. Speakers may comprise conventional speakers or modern hypersonic speakers.

Input device 160 may comprise one or more of (1) a set of alpha-numeric keys for providing input to the vending machine, such as the Programmable Master Menu® Keypad, (2) a selector dial, (3) a set of buttons associated with a respective set of item dispensers, (4) a motion sensor, (5) a barcode reader, (6) a Dual-Tone Multi-Frequency (DTMF) receiver/decoder, (7) a wireless device (e.g., a cellular telephone or wireless Personal Digital Assistant), (8) one or more cameras, such as digital video and/or digital still photographic cameras, (9) a microphone and/or a voice recognition module, (10) a fingerprint reader, (11) a topical facial pattern scanner/reader, (12) an iris or retinal scanner, (13) a microphone, (14) an infrared receiver, and/or (15) any other device capable of receiving a command from a user and transmitting the command to a processor.

As described with respect to some embodiments, a touch-sensitive screen may be employed to perform both input and output functions. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with some embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art and need not be described further herein. Suitable, commercially available touch screens for use in accordance with one or more embodiments of the present invention are manufactured by Elo TouchSystems, Inc., of Fremont, Calif., such as Elo's AccuTouch series touch screens.

Vending machine 100 may further comprise one or more inventory storage and dispensing mechanism(s) 170. Product inventory storage and product dispensing functions of a vending machine configured in accordance with a snack machine embodiment of the present invention may include one or more of: (i) a drive motor, (ii) metal and/or plastic shelving, (iii) a product delivery system (e.g., a chute, product tray, product tray door, etc.), (iv) dual spiral (i.e. double helix) item dispensing rods, (v) convertible (i.e. extendable) shelves, and/or (vi) a refrigeration unit. Further details concerning vending machine inventory storage and dispensing mechanisms are well known in the art, and need not be described in further detail herein.

In some embodiments, a vending machine may be housed in a casing of the model 129 SnackShop manufactured by Automatic Products™. In such embodiments, three removable shelves may be employed, together providing for thirty product rows and an inventory capacity of 185 to 522 commonly vended snack products.

Although FIG. 1 depicts a vending machine, it will be readily understood in light of the present disclosure that other types of transaction devices and sales devices may be used in accordance with various embodiments of the present invention, including gaming devices (e.g., casino slot machines, video lottery terminals, pachinko machines, video game machines), ATMs, kiosks, jukeboxes, payphones, and POS terminals. With respect to the exemplary components described for the vending machine 100, it will be apparent to one skilled in a relevant art that different types of vending machines and different types of transaction devices may utilize alternative and/or additional components. Of course, some types of transaction devices may not require one or more of the components depicted in FIG. 1 at all. For example, a slot machine in a casino would not necessarily need inventory storage and dispensing mechanism(s) 170. Input devices, output devices, databases, etc., appropriate for different types of vending machines and different types of transaction devices will be apparent to one skilled in the relevant art in light of the present disclosure.

Figure 2:
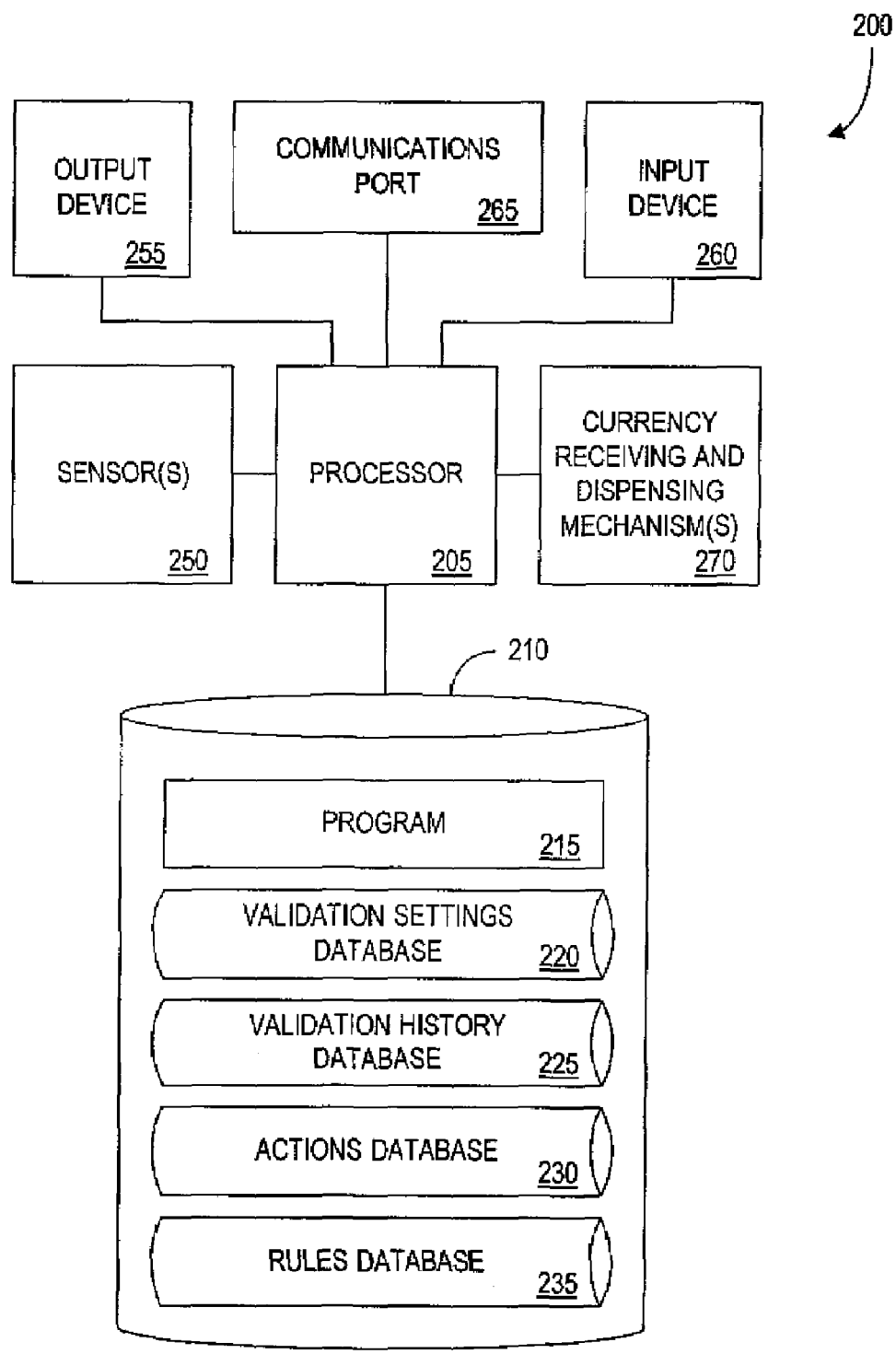
FIG. 2 is a block diagram of an embodiment of a currency validator consistent with some embodiments of the present invention.

Referring now to FIG. 2, illustrated therein is a block diagram of an embodiment of a system consistent with the present invention. More specifically, FIG. 2 is a block diagram of an exemplary currency validator 200 that may be operable (alone or via communication with one or more other devices) to perform one or more functions described herein.

Currency validator 200 may comprise one or more components for validating currency, and may comprise one or more devices such as a coin acceptor, a token acceptor, a bill validator, a coupon or voucher reader, and/or a change dispenser.

As will be readily understood, a coin acceptor may comprise one or more devices such as a 9300 Series® coin changer by CoinCo, or an Intellitrac™ Series MicroMech® coin changer (e.g., TRC 6000 series model) or MEI Cashflow™ Series 7000 coin manager by Mars Electronics International, Inc.

As will be readily understood, a validator for bills and/or other types of paper-based currency (e.g., coupons, vouchers, cashless gaming receipts) may comprise one or more devices such as an AE 2800 or LE Series 3000 bill acceptor by Mars Electronics International, or the WBA-SS by JCM American Corporation.

As is well known, currency validators typically may be operable to accept and validate one or more different denominations of currency and/or bar code coupons. For example, a bill validator may be operable to validate $1, $2, and $5 bills.

As is well known, currency validators typically employ one or more sensing techniques for detecting and analyzing characteristics of received currency. Sensed characteristics (e.g., optical characteristics of a bill) are then typically compared to prestored parameters for different currency denominations. Routines for determining correspondence between sensed characteristics and stored parameters may take into account tolerances to a desirable degree (e.g., reflecting differences among individual bills of a given denomination).

As will be readily understood by those skilled in the art, some types of currency validators allow for two or more settings or modes for validation. For instance, a bill validator may be switched between a setting associated with increased currency rejection (e.g., "High Security") and a setting associated with increased currency acceptance (e.g., "High Acceptance"). Different settings might correspond to different tolerances used in comparing one or more types of sensed characteristics to stored parameters. For instance, a setting associated with increased acceptance may tolerate a greater deviation from stored characteristics than a more secure setting. One setting may differ from another in various ways, including the acceptable values and/or tolerances for one or more characteristics, the denominations accepted, etc. Some types of currency validators allow for validation criteria (e.g., stored parameters for comparison to sensed characteristics) to be modified (e.g., so that the validator will accept a new or updated bill denomination).

The currency validator 200 may include a processor 205, such as one or more Intel® Pentium® or Centrino™ processors. The processor 205 (herein, "processor," "processor 205", "computer" or "control system") may include or be coupled to one or more clocks or timers (not pictured) and to one or more communication ports 265 through which the processor 205 may communicate, in accordance with some embodiments, with other devices. Such other devices may include, without limitation, one or more peripheral device servers, one or more servers, one or more peripheral devices, one or more transaction devices, and/or one or more user devices. In one or more embodiments, a communication port 265 may comprise a modem (e.g., a cellular modem or otherwise), and/or a wireless transmitter or transponder (e.g., an infrared transmitter/receiver, a radio transmitter/receiver). In one embodiment, the currency validator 200 may comprise a serial, parallel or multi-drop bus (MDB) interface for communicating with one or more other devices (e.g., a server, a controller, peripheral device, processor 105 of vending machine 100).

The example processor 205 is also in communication with a data storage device 210. Various exemplary embodiments, configurations and locations of memory and data storage devices are discussed above with respect to data storage device 110.

The data storage device 210 stores a program 215 for controlling the processor 205. The processor 205 performs instructions of the program 215, and may thereby operate in accordance with various embodiments of the present invention, and particularly in accordance with one or more of the methods described in detail herein. Various exemplary programming techniques and embodiments, formats, elements of programs are discussed above with respect to program 115.

Further, the program 215 is operative to execute a number of objects, modules and/or subroutines specific to one or more embodiments of the present invention.

According to some embodiments of the present invention, the instructions of the program 215 may be read into a main memory of the processor 205 from another computer-readable medium, such as from a ROM to a RAM. According to some embodiments, some or all of the instructions of the program 215 may be updated, for example, by replacement of a ROM (e.g., an EPROM) and/or download (e.g., from a server or an operator device). Execution of sequences of the instructions in the program 215 causes processor 205 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 215, the data storage device 210 is also operative to store one or more databases, such as (i) a validation settings database 220, (ii) a validation history database 225, (iii) an actions database 230, and (iv) a rules database 235. The databases 220, 225, 230 and 235 are described in detail below and example structures are depicted with sample entries in the accompanying figures.

Currency validator 200 may comprise sensor(s) 250. The sensor(s) 250 may comprise one or more devices appropriate for determining whether an item of currency has been presented (e.g., inserted by a customer) and/or whether a presented item of currency is valid. Some exemplary types of sensor(s) 250 take one or more measurements of an item of currency. Sensor(s) 250 may include, without limitation, one or more optical sensors, metal alloy sensors, reflective sensors (e.g., for measuring dark/light ratios for a bill), magnetic sensors, color sensors, photo sensors (e.g., for reading a pattern of a bill), bar code sensors, and/or sensors for taking distance-related measurements or physical dimensions of an item of currency, including length, width, thickness, and/or diameter. A currency validator may comprise hardware and/or software for optical character recognition (OCR) that may be useful, in accordance with some embodiments, for determining a face value or ostensible value of a currency item (e.g., by recognizing one or more indicia of value or other identifying information on the item).

Currency validator 200 may comprise currency receiving and dispensing mechanism(s) 270. The currency receiving and dispensing mechanism(s) 270 may comprise one or more devices and/or components for receiving an item of currency (e.g., coupon, coin, bill) from a customer, including, without limitation, a coin or bill insert slot a bill acceptance path, etc. The currency receiving and dispensing mechanism(s) 270 may comprise one or more devices and/or components for dispensing currency, including, without limitation, a coin return, a bill return, etc.

Optionally, the currency validator 200 may comprise one or more devices or components for storing one or more types of currency, such as a coin "hopper," a coin tube, a cashbox, a storage cassette, a magazine, a bill stacker box, etc. Such components may be in communication with the processor 205 and/or the currency receiving and dispensing mechanism(s) 270 may include one or more storage components. For example, a vending machine may dispense change from a coin tube of a coin acceptor.

The currency validator 200 may further comprise an output device 255 and an input device 260. It should be understood that, although only a single output device 255 and a single input device 260 is illustrated in FIG. 2, any number of output devices and/or input devices might be used. Many combinations of input and output devices may be employed as appropriate in accordance with embodiments of the present invention. For example, in embodiments that feature touch screens, a single device may provide input and output functionality. Other examples of input and output devices suitable for use with currency validator 200 are described herein (e.g., with respect to vending machine 100).

Various functionality consistent with one or more embodiments of the present invention may be provided by the processor 205, the sensor(s) 250, the currency receiving and dispensing mechanism(s) 270, the input device 260, the output device 255, and any combination thereof. In some embodiments, the processor 205 may communicate with the sensor(s) 250 and/or the currency receiving and dispensing mechanism(s) 270 to provide for various functions consistent with one or more embodiments of the present invention. For example, the processor 205 may be operable (e.g., in accordance with instructions of the program 215) to perform one or more of the following: transmitting a signal to enable/disable one or more of the sensor(s) 250; enabling/disabling acceptance of one or more particular currency types or denominations; prompting for and/or receiving a status of the sensor(s) 250 and/or currency receiving and dispensing mechanism(s) 270 (e.g., ready, $5 bill received, error); returning an item of currency (e.g., via currency receiving and dispensing mechanism(s) 270); rejecting an item of currency; accepting an item of currency; calibrating a sensor; prompting a user (e.g., via an output device 260) to provide an alternative means of payments; and/or updating settings, measurements, and/or criteria for currency validation. In some embodiments, processor 205 may comprise or respond to instructions or signals from another processing device, such as a peripheral device or controller for a transaction device (e.g., processor 105 of vending machine 100).

In one embodiment, a bill validator, coin acceptor or other type of currency validator may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein for all purposes. Further, a change dispenser may activate the return of coinage to a customer where appropriate.

Figure 3A:
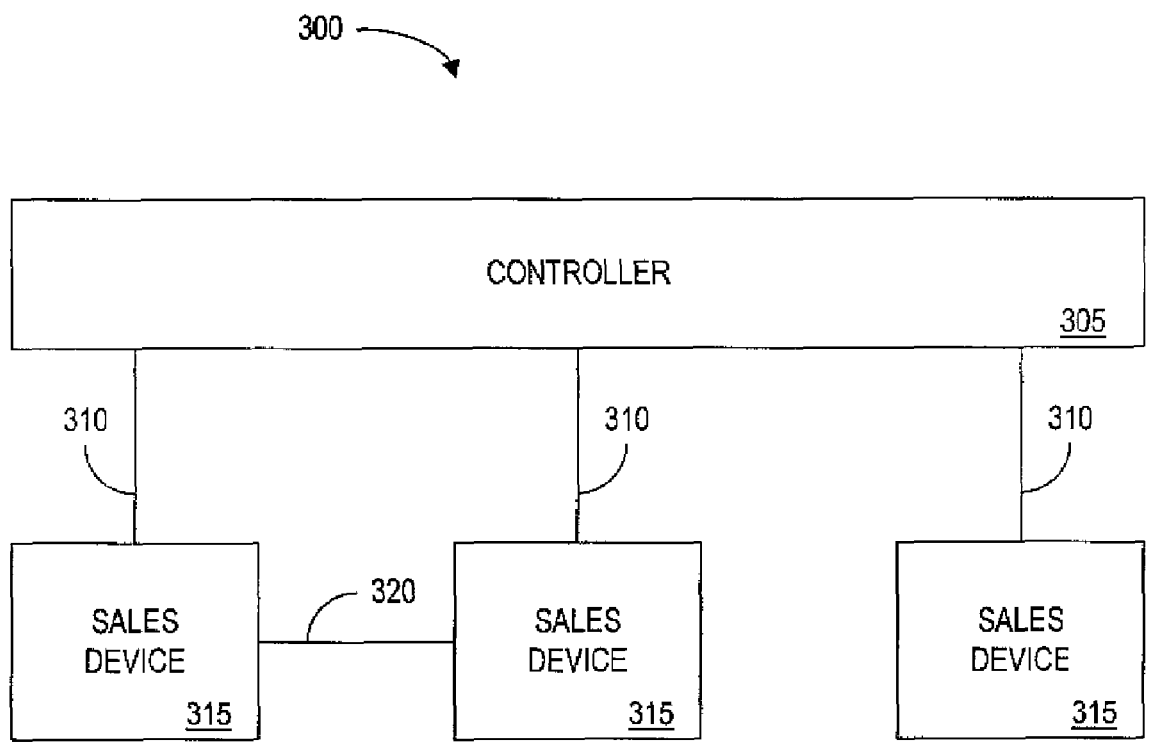
FIG. 3A is a block diagram of an embodiment of a system consistent with some embodiments of the present invention.

Referring now to FIG. 3A, a block diagram of a system 300 according to at least one embodiment of the present invention includes a controller 305 that is in communication, via a communication network 310, with one or more sales devices 315. The controller 305 may communicate with the sales devices 315 directly or indirectly, via a wired or wireless medium such as the Internet, LAN, WAN or Ethernet, Token Ring, or via any appropriate communications means or combination of communications means.

Each of the sales devices 315 may comprise one or more computers, such as those based on the Intel® Pentium® or Centrino™ processor, that are adapted to communicate with the controller 305. Sales devices 315 may include, without limitation, one or more devices operable to provide goods and/or services to a customer, such as vending machines (e.g., vending machine 100), gaming or amusement devices (e.g., slot machines, video game machines), POS terminals, and/or kiosks.

In some embodiments, a controller 305 may comprise one or more computers, such as those based on the Intel® Pentium® processor, that may or may not be located remotely from one another or remotely from one or more of the sales devices 315. Thus, in some embodiments, a controller 305 may facilitate the transmission of data between one or more sales devices 315 and one or more operator computers (not shown) so that human operators may interact remotely with sales devices and/or customers of sales devices. In some embodiments, system 300 includes a user device (not shown) that enables customers to transmit data to and/or receive data from a sales device 315 and/or controller 305.

Any number and type of sales devices 315 may be in communication with the controller 305. Communication between the sales devices 315 and the controller 305, and among the sales devices 315 (some or all of which may communicate via a communication network 320), may be direct or indirect, such as over the Internet through a Web site maintained by controller 305 on a remote server, or over an on-line data network, including commercial on-line service providers, bulletin board systems and the like. In yet other embodiments, the sales devices 315 may communicate with one another and/or controller 305 over RF, cable TV, satellite links and the like.

Some, but not all, possible communication networks that may comprise network 310 and/or network 320 or be otherwise part of system 300 include: a local area network (LAN), a wide area network (WAN), the Internet, a telephone line, a cable line, a radio channel, an optical communications line, and a satellite communications link. Communications protocols that may be part of system 300 include: Ethernet (or IEEE 802.3), SAP, ATP, Bluetooth, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In one embodiment, the controller 305 may not be necessary and/or preferred. For example, the present invention may, in one or more embodiments, be practiced on a stand-alone sales device 315 and/or a sales device 315 in communication only with one or more other sales devices 315. In such embodiments, any functions described as performed by the controller 305, or data described as stored on the controller 305, may instead be performed by and/or stored on one or more sales devices 315.

It should be noted that, in the embodiment of FIG. 3, some of the functionality described with reference to FIG. 1 as being performed by vending machine 100 (or any other transaction device or sales device described herein) and/or being performed by currency validator 200 (FIG. 2) may instead (or in addition) be performed by controller 305. Similarly, any data described with reference to FIG. 1 or FIG. 2 as being stored in a memory of vending machine 100 or currency validator 200 may, in the embodiments of FIG. 3, instead (or in addition) be stored in a memory of controller 305.

Figure 3B:
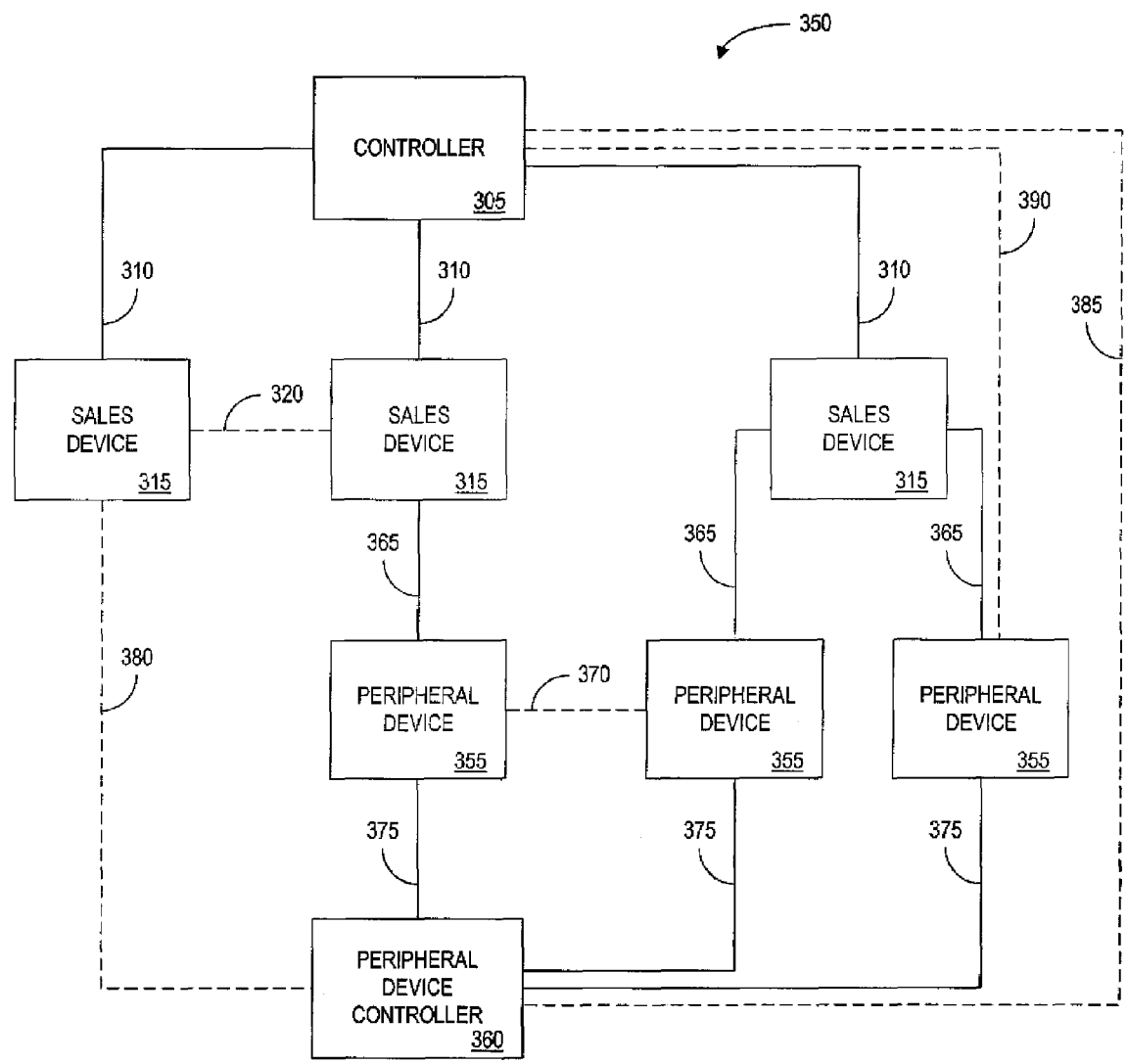
FIG. 3B is a block diagram of an embodiment of another system consistent with some embodiments of the present invention.

Referring now to FIG. 3B, a block diagram of another system 350 according to at least one embodiment of the present invention includes a controller 305 that is in communication, via a communication network 310, with one or more sales devices 315. A difference between system 300 (FIG. 3A) and system 350 (FIG. 3B) is that in system 350 at least one sales device 315 is also in communication with one or more peripheral devices 355. A peripheral device 355 may, in turn, be in communication with a peripheral device controller 360 (via communication network 375). In some embodiments, a peripheral device 355 may also or instead be in communication with controller 305 (via communication network 390), one or more sales devices 315 (via communication network 365), and/or one or more user devices (not shown). In one or more embodiments the peripheral device controller 360 may be in communication with one or more sales devices 315 (via communication network 380), controller 305 (via communication network 385), and/or user devices (not shown).

Any of the controller 305, the sales devices 315, the peripheral devices 355 and/or the peripheral device server 360 may communicate with one another directly or indirectly, via a wired or wireless medium such as the Internet, LAN, WAN or Ethernet, Token Ring, or via any appropriate communications means or combination of communications means. For example, the controller 305 may communicate directly with one of the sales devices 315 (e.g., via a LAN) and indirectly (e.g., via a sales devices 315) with a peripheral device 355. In another example, the controller 305 may communicate with one of the sales devices 315 via a LAN and with another of the sales devices 315 via the Internet.

Any and all of the controller 305, the sales devices 315, the peripheral devices 355 and the peripheral device controller 360 may comprise computers, such as those based on the Intel® Pentium® or Centrino™ processor. Further, in one or more embodiments, each of the peripheral devices 355 may comprise an external or internal module associated with one or more of the sales devices 315 that is capable of communicating with one or more of the sales devices 315 and of directing the one or more sales devices 315 to perform one or more functions.

Any number of sales devices 315 may be in communication with the controller 305. Any number and type of peripheral devices 355 may be in communication with a sales device 315, peripheral device controller 360 and controller 305.

Communication between any of the controller 305, the sales devices 315, the peripheral devices 355 and the peripheral device controller 360, among the sales devices 315 and among the peripheral devices 355 may be direct or indirect, such as over the Internet through a Web site maintained by controller 305 on a remote server, or over an on-line data network, including commercial on-line service providers, bulletin board systems and the like. In yet other embodiments, any and all of controller 305, the sales devices 315, the peripheral devices 355 and the peripheral device controller 360 may communicate with one another over RF, cable TV, satellite links and the like.

Some, but not all, possible communication networks that may comprise any or all of the networks 310, 320, 365, 370, 375, 380, 385 and 390, or that otherwise may be part of system 350 include: a local area network (LAN), a wide area network (WAN), the Internet, a telephone line, a cable line, a radio channel, an optical communications line, and a satellite communications link. Communications protocols that may be part of system 350 include: Ethernet (or IEEE 802.3), SAP, ATP, Bluetooth, and TCP/IP. Communication may be encrypted to ensure privacy and prevent fraud in any of a variety of ways well known in the art.

Figure 3C:
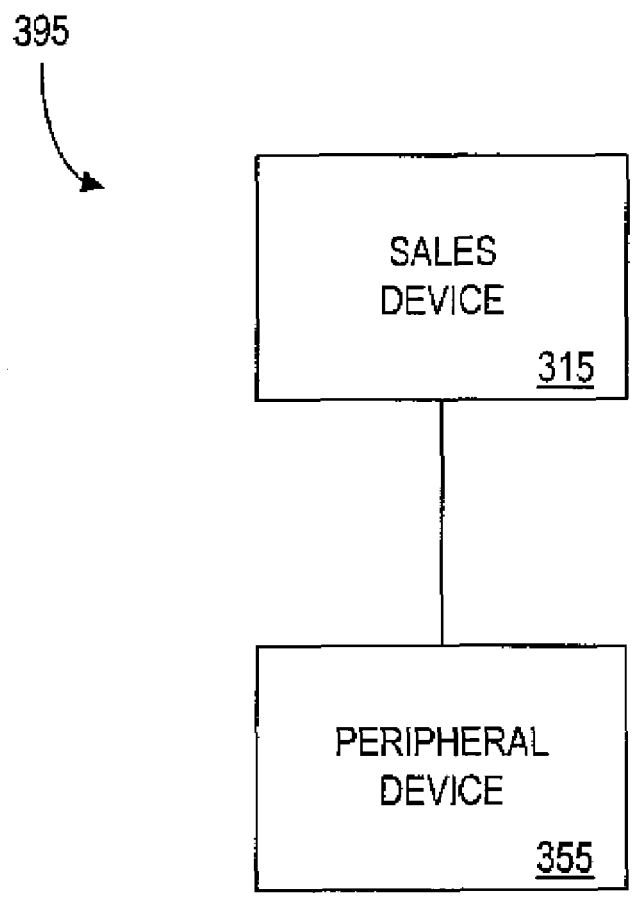
FIG. 3C is a block diagram of an embodiment of yet another system consistent with some embodiments of the present invention.

In one embodiment, the controller 305 may not be necessary and/or preferred. For example, the present invention may, in one or more embodiments, be practiced on a stand-alone sales device 315, one or more sales devices 315 in communication with one or more peripheral devices 355 (as illustrated in FIG. 3C), one or more sales devices 315 in communication with peripheral device controller 360, one or more peripheral devices 355 in communication with peripheral device controller 360, and/or a sales device 315 in communication only with one or more other sales devices 315. In such embodiments, any functions described as performed by a particular device (e.g., by a sales device 315) or data described as stored in a memory of a particular device (e.g., in a memory of a sales device 315) may instead or in addition be performed by or stored in another of the devices described herein (e.g., a peripheral device 355).

Similarly, peripheral device controller 360 may not be desired and/or needed in some embodiments of the present invention. In embodiments that do not involve peripheral device controller 360, any or all of the functions described herein as being performed by peripheral device controller 360 may instead be performed by controller 305, one or more sales devices 315, one or more peripheral devices 355, or a combination thereof. Similarly, in embodiments that do not involve peripheral device controller 360 any data described herein as being stored in a memory of peripheral device controller 360 may instead be stored in a memory of controller 305, one or more sales devices 315, one or more peripheral devices 355, or a combination thereof.

Any or all of the sales devices 315 may, respectively, include or be in communication with a peripheral device 355. A peripheral device 355 may be a device that obtains (e.g., receives or reads) information from (and/or transmits information to) one or more sales devices 315. For example, a peripheral device 355 may be operable to obtain information about transactions being conducted at a sales device 315, such as the initiation of a transaction, an amount of money deposited for a transaction and/or a product selected during a transaction. For example, a peripheral device 355 may monitor activities carried out by a processor of a sales device 315.

In one or more embodiments, one or more peripheral devices 355 may be in communication with a peripheral device controller 360. This allows the peripheral device controller 360 to receive information regarding a plurality of transactions conducted at a plurality of sales devices 315. The peripheral device controller 360, in turn, may be in communication with the controller 305. It should be understood that any functions described herein as performed by a peripheral device 355 may also or instead be performed by the peripheral device controller 360. Similarly, any data described herein as being stored on or accessed by a peripheral device 355 may also or instead be stored on or accessed by the peripheral device controller 360.

In some embodiments, at least one peripheral device 355 comprises one or more devices for validating currency (e.g., currency validator 200, currency validator(s) 150) operable to perform one or more of the methods described herein (alone or in combination with one or more other devices).

Another example of a device that may comprise a peripheral device 355 is the e-Port™ by USA Technologies Inc. The e-Port™ is a credit and smart card-accepting unit that controls access to office and MDB vending equipment, and serves as a point-of-purchase credit card transaction device. The e-Port™ includes an LCD that allows for the display of color graphics, and a touch-sensitive input device (touch screen) that allows users to input data to the device. The display may be used to prompt users interactively with, e.g., promotions and information about their transaction status.

A peripheral device 355 may be operable to receive input from customers, receive payment from customers, exchange information with a remotely located server (e.g., controller 305 and/or peripheral device controller 360), and/or display messages to customers. A peripheral device 355 may be operable to instruct a sales device 315 that appropriate payment has been received (e.g., a valid bill has been received by the separate device from a customer) and/or that the sales device should dispense a particular product. Further, a peripheral device 355 may be operable to instruct the sales device 315 to execute process steps and/or output messages (e.g., product information).

The functions described herein as being performed by a peripheral device controller 360 and/or a peripheral device 355 may, in one or more embodiments, be performed by the controller 305 (in lieu of or in conjunction with being performed by a peripheral device controller 360 and/or a peripheral device 355). Controller 305 may perform such functions in either system 300 (FIG. 3A) or system 350 (FIG. 3B).

In one or more embodiments, a peripheral device 355 may be useful for implementing the embodiments of the present invention into the operation of a conventional sales device (e.g., a vending machine). For example, in order to avoid or minimize the necessity of modifying or replacing a program already stored in a memory of a conventional vending machine, an external or internal module that comprises a peripheral device 355 may be inserted in or associated with the vending machine. For example, a conventional vending machine may be retrofitted with a peripheral device 355 in order to implement one or more embodiments of the present invention. Similarly, a conventional currency validator may be retrofitted with a peripheral device 355 in order to implement one or more embodiments.

A peripheral device 355 may include (i) a communications port (e.g., for communicating with one or more sales devices 315, peripheral device controller 360 another peripheral device 355, and/or controller 305); (ii) a display (e.g., for graphics and/or text associated with a promotion), (iii) another output means (e.g., a speaker, light, or motion device to communicate with a customer), (iv) a benefit providing means (e.g., a printer and paper dispensing means), and/or (v) an input means.

In one or more embodiments, the peripheral device 355 may direct a sales device (e.g., a vending machine 100) to perform certain functions. For example, a program stored in a memory of peripheral device 355 may cause a processor of a sales device 315 to perform certain functions. For example, a program stored in a memory of peripheral device 355 may cause a processor of a vending machine to reject an item of currency, accept an item of currency, adjust one or more validation settings, dispense one or more products, dispense a monetary amount, refrain from dispensing a monetary amount, refrain from outputting a product, and/or communicate with another device.

Note that, in one or more embodiments, a sales device 315 and a peripheral device 355 that is associated with the sales device 315 may not communicate with one another at all. In some embodiments, however, each may communicate with a computer or other device. For example, a sales device 315 may communicate with controller 305 and an associated peripheral device 355 may communicate with peripheral device controller 360 and/or controller 305. For example, if both sales device 315 and peripheral device 355 are in communication with controller 305, each may obtain information associated with the other through controller 305.

It should be noted that in either the system 300 (FIG. 3A) or the system 350 (FIG. 3B), the controller 305 and/or the peripheral device controller 360 might be accessible, directly-or indirectly, via another computer (communicating, e.g., over the Internet or other network) by a customer or another entity. Accordingly, a customer or other entity (e.g., an owner of a vending machine) of the other computer could communicate with the controller 305 and/or peripheral device controller 360 via a Web browser or other type of application. The other computer could, e.g., receive from the controller 305 and/or peripheral device controller 360 messages described herein as being output by a vending machine or peripheral device, and/or transmit to the controller 305 and/or peripheral device controller 360 input described herein as being provided to the sales device 315. Similarly, various data described herein as received through an input device of a sales device 315 and/or peripheral device 355 may be received through a Web browser communicating with the controller 305 and/or peripheral device controller 360, which in turn communicates with the sales device 315. Thus, an operator of a sales device may have remote polling and reporting capabilities (e.g., remote access to vending machine databases and diagnostics), may be able to transmit instructions and/or commands to the sales device 315, may be able to communicate with customers of sales device 315 (via sales device 315's input and output devices), and the like.

Referring now to FIG. 3C, a block diagram of another system 395 according to at least one embodiment of the present invention includes a sales device 315 that is in communication with a peripheral device 355. As described above, a prior art sales device 315 (e.g., a vending machine) may be retrofitted with a peripheral device 355 (e.g., a currency validator). The peripheral device 355 may be operable to perform at least some of the methods of the present invention and/or to direct the sales device 315 to perform at least some of the methods of the present invention, without requiring a controller 305 and/or a peripheral device controller 360. In one or more embodiments, the sales device 315 and/or the peripheral device 355 may be accessible from a remote location via a communication port.

Figure 4:
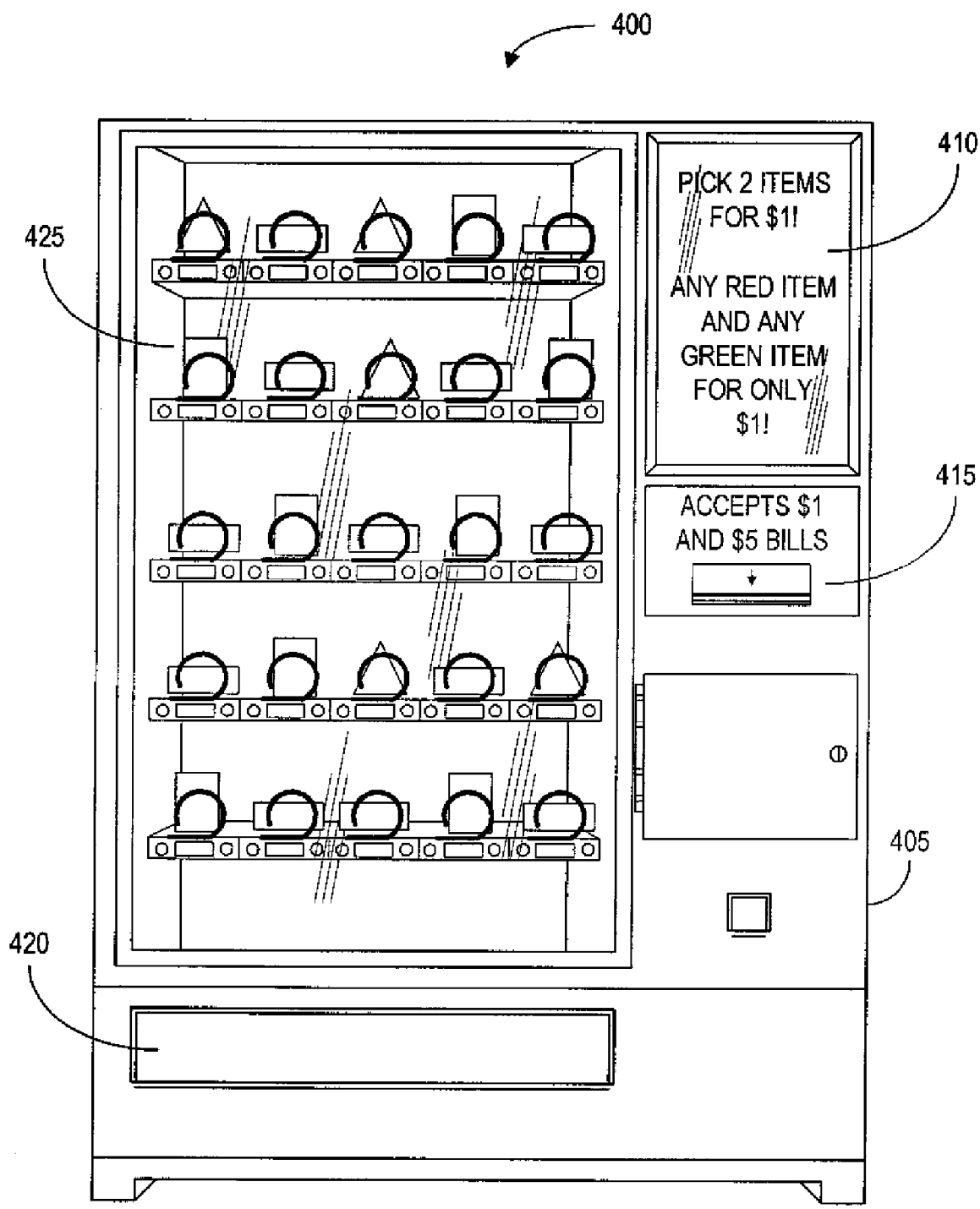
FIG. 4 is a diagram illustrating an example of the external appearance of a vending machine consistent with some embodiments of the present invention.

Referring now to FIG. 4, a diagram of an embodiment 400 of the external appearance of an exemplary vending machine 100 is illustrated. The embodiment 400 includes (i) a cabinet 405, (ii) an input/output device 410 for receiving information from a customer and/or outputting text and/or graphical information to a customer, (iii) a currency validator 415, (iv) an inventory dispensing mechanism 420, and (iv) a product display window 425. Various products available for sale and the product storage mechanism that holds the products within the vending machine 100 are depicted as being visible through the product display window 425.

Cabinet 405 may be constructed from, for example, any combination of (1) commercial grade (e.g., sixteen-gauge) steel (e.g., for exterior panels and internal shelving), (2) transparent materials such as glass or Plexiglas (e.g., for product display window 425), (3) rubber (e.g., for waterproofing insulation), (4) plastic, (5) aluminum, and/or (6) any suitable material.

Many commercially available machine cabinets can be modified to work in accordance with the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/1988 mm, and a depth of 35"/889 mm. Other suitable snack machine casings include the A La Carte™ machine from Automatic Products™, and the GPL SnackVendor™ model # 159 from Crane Merchandising Systems/Crane Co.™ of Stamford, Conn.

In beverage machine embodiments, machine cabinets commercially available from Dixie Narco™, Inc. of Willisto, S.C. may be employed. Beverage machine cabinets may comprise a "cooler" or "glass front" style front panel, featuring a transparent front panel (e.g., glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry for various types of transaction devices and sales devices are well known in the art, and need not be described in further detail herein.

It should be noted that although exemplary currency validator 415 is depicted as a bill validator in FIG. 4, currency validator 415 may comprise any one or more of the components described with reference to currency validator(s) 150 (FIG. 1) and/or currency validator 200 (FIG. 2). Similarly, product dispensing mechanism 420 may comprise one or more of the components suitable for dispensing products described above with reference to inventory storage and dispensing mechanism(s) 170 (FIG. 1).

In one embodiment, a control system executes instructions for managing the operation of the transaction device or currency validator, for example, and in particular in accordance with the inventive functionality described herein. Such device functions include, but are not limited to:

a) adjusting currency validation settings (e.g., modifying comparison measurements and/or ranges, enabling and/or disabling currency types, etc.), b) recording/transmitting currency validation history information (number and/or type of currency items presented, accepted, rejected, etc.), c) recording/transmitting transaction information (inventory levels, customer information, sales volume, acceptance rates for promotions, etc.), d) product pricing (e.g., displaying prices via an LED, changing such prices where appropriate, etc.), e) processing vending transactions by (i) receiving customer selections via an input device, (ii) processing payment via a payment processing mechanism, and (iii) actuating corresponding product dispensing mechanisms, f) selecting promotions or promotion types and constructing promotion instances, and g) outputting promotions to customers via output devices (including display of graphics/content on LCD and LED displays).

In some embodiments, machine components (e.g., machine hardware, including mechanical hardware such as input devices, output devices, product dispensing mechanisms, and payment processing mechanisms including coin acceptors, bill validators, card readers, change dispensers, etc.) may be controlled by the control system through a standard RS-232 serial interface. In such embodiments, embedded API/devices may be used to enable software to actuate/control vending machine components via RS-232 connectivity. Such machine components may be operatively connected to the control system directly or indirectly, in any manner that is practicable. Alternatively, machine components may communicate with the control system through a Universal Serial Bus "USB" standard (e.g., USB ports may allow "plug-and-play" installation of machine components).

Various types of control software may be utilized to implement one or more embodiments of the present invention. An exemplary control layer software component may interface with at least one machine component software component and thereby transmit commands to perform such functions as: (i) dispensing change due to a customer via a payment processing mechanism, which may include a change dispenser and a currency storage apparatus (i.e., several machine components), (ii) accepting a presented item of currency via a payment processing mechanism (i.e., a machine component), (iii) dispensing products via a product dispensing mechanism (i.e., a machine component), and/or (iv) outputting promotion information via an output device (i.e., a machine component).

One embodiment of an exemplary portion of control software, and one embodiment of exemplary software architecture suitable (alone or in combination) for implementing one or more embodiments of the present invention are described, among other things, in U.S. patent application Ser. No. 10/855,247, incorporated by reference herein. It should be noted, however, that many architectural configurations and many types of control software are possible to carry out the inventive processes described herein.

C. DATABASES

Embodiments of the present invention may be implemented using one or more databases. It should be noted that although the example embodiments depicted in FIGS. 1 and 2 include a number of particular databases stored in the respective data storage devices 110 and 210, other database arrangements may be used which would still be in keeping with the spirit and scope of the present invention. In other words, the present invention could be implemented using any number of different database files or data structures, as opposed to those depicted in FIGS. 1 and 2. In one embodiment, the information of one or more of the databases of a vending machine 100 (FIG. 1) may be stored, alternatively or in addition, in the data storage device 210 of a currency validator 200 (FIG. 2), and vice versa. Further, the individual database files could be stored on different servers (e.g., located on different storage devices in different geographic locations, such as on a peripheral device 355, controller 305, peripheral device controller 360 or a combination thereof). Likewise, the programs 115 and 215 could also be located remotely from the data storage devices 110 and 210 and/or on another server. As indicated above, the programs 115 and 215 may include instructions for retrieving, manipulating, and storing data in the depicted databases, as may be useful in performing the methods of the invention as will be further described below.

1. Product Inventory Database

Turning to FIGS. 5A and 5B, illustrated therein is a tabular representation of an embodiment 500 of the product inventory database 120 (FIG. 1). The tabular representation 500 of the product inventory database includes a number of example records or entries, each of which defines a product available for sale from a vending machine. Those skilled in the art will understand that the product inventory database may include any number of entries.

The tabular representation of the product inventory database also defines fields for each of the entries or records. The fields specify: (i) a product identifier 505 that uniquely identifies the product; (ii) a product description 510 that describes the product; (iii) a product category 515 into which the product has been categorized; (iv) a row position 520 that identifies a particular row (and, optionally, a particular position within a particular row) of the vending machine in which the product is located; (v) a retail price 525 of the product; (vi) a minimum selling price 530 of the product; (vii) a cost 535 of the product; (viii) an actual (current) product velocity 540; (ix) a desired product velocity 545; (x) a current number in stock 550 that indicates a number of the product currently available for sale; and (xi) a status 555 that indicates whether the product is enabled or disabled for dispensing.

The product inventory database may be accessed by various devices and/or for various purposes. For example, the processor 105 of the vending machine 100 may access the product inventory database to determine whether a product is currently available for sale from the vending machine (e.g., whether the current number available is greater than zero). In another example, the processor of the vending machine 100 and/or a processor of a peripheral device 355 may access the product inventory database 500 to (i) determine whether to modify one or more validation settings; (ii) determine whether to accept one or more items of currency; (iii) determine whether a promotion should be output; (iv) identify a type of promotion to be output; (v) enable/disable one or more products; and/or (vi) construct a promotion instance.

The product inventory database may be populated, for example, when an operator of the vending machine associated with the database adds products to the vending machine (e.g., the operator may enter a number of each product entered using a keypad of the vending machine or a bar code scanner in communication with the vending machine). U.S. patent application Ser. No. 10/951,296 is incorporated by reference herein and includes, among other things, some examples of apparatus and methods for managing a load process for a vending machine that are suitable with one or more embodiments of the present invention. The product inventory database may also be updated when a product is dispensed from the vending machine associated with the database, or when a controller determines to disable one or more products (e.g., in response to receiving suspect currency).

It should be noted that, in some embodiments, the product inventory database might store information associated with more than one vending machine. This may occur, for example, if the product inventory database is stored in controller 305, peripheral device controller 360 and/or a peripheral device 355 that is associated with more than one vending machine 100. In such embodiments, the product inventory database may store a vending machine identifier in association with one or more records.

2. Transaction History Database

Turning to FIGS. 6A and 6B, illustrated therein is a tabular representation of an embodiment 600 of the transaction history database 130 (FIG. 1). The tabular representation 600 of the transaction history database includes a number of example records or entries, each of which defines a transaction that has occurred at a vending machine. Those skilled in the art will understand that the transaction history database may include any number of entries.

The tabular representation of the transaction history database also defines fields for each of the entries or records. The fields specify: (i) a transaction identifier 605 that uniquely identifies a transaction; (ii) a transaction date 610 that indicates the date on which the transaction occurred; (iii) the transaction time 615 that indicates the time at which the transaction occurred; (iv) a product(s) purchased 620 that stores an indication (e.g., product identifier and/or description) of products purchased during the transaction; (v) a transaction total 625 that indicates the purchase total for the transaction; (vi) an amount tendered 630 that indicates the amount of money input for the transaction by a customer; (vii) a change dispensed 635 that indicates an amount of change dispensed for the transaction; (viii) a promotion identifier 640 that uniquely identifies an instance of promotion and/or a promotion type output in association with the transaction; and (ix) a response 645 of a customer to the instance of the promotion and/or the promotion type.

The transaction history database may be accessed by various devices and/or for various purposes. For example, the processor of the vending machine 100 may access the transaction history database to store information about a transaction currently in progress or recently completed at the vending machine. In another example, the processor of the vending machine 100 and/or a processor of a peripheral device 355 may access the transaction history database to (i) determine whether an item of currency should be accepted; (ii) determine whether one or more validation settings should be modified; (iii) determine whether a promotion should be output; (iv) identify a type of action to take upon receiving an item of currency; (v) identify a type of promotion for output; and/or (vi) construct a promotion instance by populating a parameter of the promotion type with a value determined based on the data in the transaction history database.

The transaction history database may be updated, for example, upon the initiation and/or completion of each transaction at the vending machine associated with the database.

It should be noted that, in some embodiments, the transaction history database might store information associated with more than one vending machine. This may occur, for example, if the transaction history database is stored in controller 305, peripheral device controller 360 and/or a peripheral device 355 that is associated with more than one vending machine 100. In such embodiments, the transaction history database may store a vending machine identifier in association with one or more records.

In some embodiments, the transaction history database may store an identifier that identifies a currency validator (e.g., the currency validator that was used in a particular transaction associated with a record). In some embodiments, the transaction history database may be stored (additionally or alternatively) in one or more currency validators.

3. Validation Settings Database

FIG. 2 depicts a validation settings database 220. Various types of settings and other types of information useful for validating currency, and various ways of storing information related to currency validation, will be readily understood by those skilled in the art. As discussed herein, validation settings may comprise one or more stored parameters for comparison with measured or sensed characteristics of presented currency. In some embodiments, a validation setting may be associated with any number of parameters. For instance, a "High Security" setting may be associated with various predetermined criteria and/or tolerances for any number of currency denominations and/or currency types. In some embodiments, validation settings may be associated with one or more routines, algorithms, or programs for determining correspondence between presented currency and stored parameters for validation. Those skilled in the art will understand that the validation settings database may include any number of entries.

The validation settings database may be accessed by various devices and/or for various purposes. For example, the processor of the currency validator 200 may access the validation settings database to update one or more stored parameters after receiving a predetermined number of coins the currency validator deems invalid. In another example, the processor of the vending machine 100 and/or a processor of a peripheral device 355 may access the validation settings database to switch a currency validator to a mode associated with increased acceptance of one or more types of currency.

The validation settings database may be updated, for example, when an operator of a vending machine changes a setting of the currency validator (e.g., by setting a hardware switch), when a customer inserts an invalid item of currency, and/or when a customer inserts a valid item of currency within a predetermined time period after a rejected item is presented.

It should be noted that, in some embodiments, the validation settings database might store information associated with more than one vending machine and/or currency validator. This may occur, for example, if the validation settings database is stored in controller 305, peripheral device controller 360 and/or a peripheral device 355 that is associated with more than one vending machine 100 and/or more than one currency validator. In such embodiments, the validation settings database may store a vending machine identifier and/or currency validator identifier in association with one or more records.

It will be readily understood that in some embodiments, a validation settings database may be stored (additionally or alternatively) in vending machine 100 or other type of transaction device.

4. Validation History Database

Turning to FIG. 7, illustrated therein is a tabular representation of an embodiment 700 of the validation history database 225 (FIG. 2). The tabular representation 700 of the validation history database includes a number of example records or entries, each of which is associated with an item of currency (e.g., presented at a vending machine). Those skilled in the art will understand that the validation history database may include any number of entries.

The tabular representation of the validation history database also defines fields for each of the entries or records. The fields specify: (i) a validation identifier 705 that uniquely identifies a presentment of an item of currency; (ii) a validation date 710 that indicates the date on which the presentment occurred; (iii) a validation time 715 that indicates the time at which the presentment occurred; (iv) an item status 720 that stores an indication of whether the item was determined to be valid, invalid, suspect, etc., (e.g., by a currency validator); (v) an item value 725 that stores an indication of a determined value of the presented item (if, for example, a value, probable value, or estimated value can be determined); (vi) an accepted item 730 that stores an indication (e.g., "YES," "NO") of whether the item was accepted as payment (e.g., for a transaction); (vii) an action taken 735 that indicates any action(s) and/or action type(s) taken related to the validation; and (viii) an optional transaction identifier 740 that uniquely identifies a transaction associated with the item of currency, if any (e.g., a purchase made at a vending machine using an accepted item of currency).

The validation history database may be accessed by various devices and/or for various purposes. For example, the processor of the currency validator 200 may access the validation history database to add one or more new records after receiving an input of coins or bills from a customer and/or determining whether any presented currency is valid. In another example, the processor of the vending machine 100 and/or a processor of a peripheral device 355 may access the validation history database to (i) determine whether a presented item of currency should be accepted; (ii) determine whether one or more validation settings should be modified; (iii) determine whether a promotion should be output; (iv) identify a type of action to take upon receiving an item of currency; (v) identify a type of promotion for output; and/or (vi) construct a promotion instance by populating a parameter of the promotion type with a value determined based on the data in the transaction history database.

It should be noted that in some embodiments, the validation history database might store information associated with more than one currency validator and/or vending machine. This may occur, for example, if the validation history database is stored in controller 305, peripheral device controller 360 and/or a peripheral device 355 that is associated with more than one currency validator 200 and/or more than one vending machine 100. In such embodiments, the validation history database may store a currency validator identifier and/or vending machine identifier in association with one or more records.

In some embodiments, the validation history database may comprise a currency inventory (e.g., a coin inventory) that may be useful in some embodiments of the present invention (e.g., for determining what type of promotion to provide a customer).

It will be readily understood that in some embodiments, a validation history database may be stored (additionally or alternatively) in vending machine 100 or another type of transaction device.

5. Actions Database

Turning to FIG. 8, illustrated therein is a tabular representation of an embodiment 800 of the actions database 230 (FIG. 2). The tabular representation 800 of the actions database includes a number of example records or entries, each of which defines an action that is available for output. Those skilled in the art will understand that the actions database may include any number of entries.

The tabular representation of the actions database also defines fields for each of the entries or records. The fields specify: (i) an action identifier 805; (ii) an action type 810; (iii) condition(s) for action 815; and (iv) an action description 820 that describes a particular action of the action type 810.

In some embodiments, a rules database may store rules for selecting an available action. In such embodiments, the condition(s) for output 815 may not be stored in the actions database. For example, the condition(s) for output 815 may be stored in the rules database 235, discussed below.

The actions database may be accessed by various devices and/or for various purposes. For example, the processor of the currency validator 200 and/or a processor of a peripheral device 355 may access the actions database to select an action for processing currency presented by a customer at a vending machine. In another example, the processor of a vending machine 100 and/or a processor of a peripheral device 355 may access the actions database to determine an action to take.

Actions may be added or removed from the actions database by, for example, an operator of the vending machine associated with the database (e.g., the operator may access the actions database remotely and add or delete actions as desired). Alternatively or additionally, a device (e.g., the vending machine 100, a peripheral device 355, controller 305, peripheral device controller 360, or a combination thereof may add or remove actions (e.g., based on availability of products, inventory of currency, validation history, and/or success rates of promotions or other types of actions).

It should be noted that, in some embodiments, the actions database may store information associated with more than one currency validator and/or more than one vending machine. This may occur, for example, if the actions database is stored in controller 305, peripheral device controller 360 and/or a peripheral device 355 that is associated with more than one currency validator. In such embodiments, the actions database may store a currency validator identifier in association with one or more records (e.g., to indicate which actions are available at which currency validator(s)).

6. Rules Database

A database of rules may be useful for various processes, in accordance with embodiments of the present invention. For example, rules may be used to select an action from a list of predetermined actions. For instance, a rules database may be used to determine which of a plurality of action types are eligible to be taken in a particular circumstance (e.g., when a customer presents a bill that might be fraudulent). In yet another example, a rules database may be used to select an action type from a plurality of eligible action types. Various types of actions that may be available in accordance with embodiments of the present invention are described in detail herein. In yet another example, rules may be used to construct an offer or other type of message (e.g., a prompt for additional information from a customer) by providing guidance for the selection of a value to populate a parameter of a message type.

Turning to FIG. 9, illustrated therein is a tabular representation of an embodiment 900 of the rules database 235 (FIG. 2). The tabular representation 900 of the rules database includes a number of example records or entries R-901 to R-908, each of which defines a condition and indicates one or more types of actions that may be taken if the condition is satisfied. The embodiment 900 includes conditions pertaining to transaction information, states of a vending machine, and/or information related to currency validation that may be considered to determine an appropriate type of action. Those skilled in the art will understand that the rules database may include any number of entries.

The tabular representation 900 of the rules database also defines fields for each of the entries or records. The fields specify: (i) a condition 905 that must be satisfied in order for a corresponding action to be performed, and (ii) eligible action type(s) 910 that indicate the one or more action types associated with the corresponding condition.

As stated, stored rules that consider available, current data may indicate (or dictate) which action types are eligible to potentially serve as the basis for a particular action (e.g., increasing/decreasing sensitivity of a currency validator for one or more currency types/denominations, prompting a customer for additional information). For example, such rules may dictate that various sales and transaction information states (e.g., total sales volume, sales velocity, inventory level) should instruct the processor of a vending machine 100, the processor of a currency validator 200, and/or the processor of a peripheral device 355 to identify corresponding action types as eligible actions.

The rules database may be accessed by various devices and/or for various purposes. For example, the processor of the vending machine 100, currency validator 200 and/or controller 305 may access the rules database to determine whether a current state of product inventory satisfies any of the criteria described in the condition 905, thereby determining whether there are any eligible actions to take.

For example, as illustrated in R-901 of table 900, if the total revenue received (e.g., at a vending machine) is less than a predetermined threshold (e.g., $100), a type of "DECREASE SECURITY" action may be taken. For instance, the sensitivity or security level of a currency validator may be decreased with respect to one or more types and/or denominations of currency.

In another example illustrated in R-908 of table 900, if a currency item (e.g., presented by a customer at a sales device) is suspect, one or more of various exemplary types of actions may be taken. For instance, the customer may be prompted to provide additional information (e.g., a driver's license number, a credit card account number); one or more products may be disabled, one or more offers may be offered; a risk premium may be determined; a prompt for an alternate currency may be transmitted (e.g., to a customer); and/or a dynamic upsell offer may be provided. In one example, an item of currency may be considered suspect if it is invalid under one validation mode (e.g., a current or active mode) but would be deemed valid under another (e.g., more tolerant or less secure) validation mode. Further, in one example, upon the presentment of suspect currency and the selection of an item by a customer, the appropriate action type may comprise an offer encouraging the purchase of a higher margin product from the same category as the product initially selected by the customer. Should the customer accept the substitute product offer, the risk of accepting the suspect currency would be mitigated.

The rules database may store rules programmed by, for example, an operator or manufacturer of a currency validator and/or vending machine associated with the database.

The rules database of FIG. 9 may be accessed by various devices and/or for various purposes. In some embodiments the rules database may store information associated with more than one vending machine and/or more than one currency validator and thus may store one or more corresponding device identifiers in association with one or more records.

It will be readily understood that in some embodiments, only one of the actions database 230 and the rules database 235 may be necessary. For example, some embodiments may provide only for identifying eligible action types, while other embodiments may provide for identifying only specific actions (and may not even store information about action types). In another example, one database may include all of the information and conditions illustrated in the example tables 800 and 900, and thus would be useful for identifying any eligible action types and specific actions based on relevant information. As noted above, in some embodiments, a rules database may store rules for determining a particular action in addition to or in lieu of identifying an eligible action type. In such embodiments, the condition(s) for output 815 may not be stored in the actions database. For example, the condition(s) for output 815 may be stored in the rules database 235.

D. PROCESSES

According to some embodiments of the present invention, a control system (e.g., of a vending machine 100) dynamically sets one or more sensitivity levels used in determining when a currency validator will accept or reject cash currency. During a given sales period, for example, the control system may periodically or substantially continuously evaluate one or more types of data in light of rules stored in the rules database 235, and may adjust the sensitivity of a currency validator accordingly. For example, one or more types of possible actions for adjusting the security or acceptance levels of one or more currency validators may be determined based on sales data or other transaction information.

In one embodiment, the amount of revenue received by a vending machine or other type of sales device in a given period (e.g., since an operator's last service or maintenance session) is determined. If the determined revenue during the period is below a predetermined threshold, then the control system may determine that an action to decrease or "ratchet down" a sensitivity level for currency validation is appropriate. Similarly, as discussed herein, if the actual product velocity for a given product or products is less than a threshold (e.g., the ideal or target product velocity for a product or products), then the control system may determine an action to decrease or "ratchet down" a sensitivity level for currency validation. Such a determination may be based on a stored rule reflecting an assumption, for example, that one reason sales may be slower than desirable is because the validation setting(s) for one or more currency validators are too sensitive. Accordingly, an action to decrease the sensitivity for currency validation is determined. For instance, a possible action may be to decrease an initial sensitivity level (e.g., one set by an operator) of a bill validator of the vending machine (e.g., by changing one or more settings in validation settings database 220).

According to some embodiments of the present invention, one or more actions may be determined based on the number of currency presentments and/or the number of currency rejections at a transaction device. If the number of bill presentments at a vending machine, for example, exceeds a certain threshold, a control system may determine that an action to decrease the security of bill validation is appropriate. The threshold may be set so that even assuming a certain percentage of the number of presentments are fraudulent (e.g., counterfeit bills), the potential increased revenue associated with accepting more presented bills is greater than the current or projected revenue at the current security level.

For example, the control system may compare forecasted revenue corresponding to different security settings for currency validation. For instance, the control system may determine that the current security level is set at "High Security" and current sales at that security level are $50 per week (i.e., $50 per week is accepted as valid payment). The control system may further determine that if validation sensitivity were set at "Medium Security", the vending machine would accept $100 per week as valid payment. The control system may determine (e.g., based on stored rules, based on previous fraud rates) that 25% of all currency accepted at Medium Security is fraudulent. Accordingly, the control system may determine that if the sensitivity level is reduced from High Security to Medium Security, the vending machine will realize $25 more in revenue per week, even with the increased risk of accepting counterfeit bills at the lower security setting. Specifically, $100 (per week)*0.25=$75 per week in valid currency under Medium Security, which is $25 more per week than the $50 accepted under High Security. Accordingly, the control system may dynamically set the sensitivity level for bill validation to Medium Security because the expected margin associated with that action is greater than the expected value of maintaining the current (higher) security level. In other words, the risk of accepting more counterfeit bills under a lower security setting may be countered by the potential to realize greater revenue (e.g., from presentations of valid currency that might have been erroneously rejected under a more secure setting).

Thus, some embodiments of the present invention may use sales information and other types of revenue management information to manage the sensitivity of a currency validator and/or the risk of accepting fraudulent currency. In some embodiments, for example, a control system may adjust the security settings for one or more currency validators (or other types of payment processing apparatus) based on supply and demand data, including information about inventory. For example, the control system of a vending machine or currency validator may determine that based on current demand and inventory (e.g., snack inventory), the vending machine will sell out of one or more items in its inventory before the end of a fill period. Based on this determination, the control system may determine (e.g., based on one or more stored rules) that it is appropriate to increase the security of currency validation. Such a determination may be based on an assumption (e.g., of the owner or operator) that if demand is high enough relative to inventory, the currency validator can afford to be more conservative, secure or selective in what currency it accepts as payment. For instance, even if a bill that is actually valid is rejected under the more secure setting, given the demand and low inventory, it is still likely that enough customers will present acceptable currency to buy out most if not all of the remaining items. Conversely, if items are selling more slowly than is desirable (e.g., at less than a desired velocity), a control system may decrease security settings in order to increase the likelihood that presented items of currency will be deemed acceptable and/or that most or all of the inventory will be sold by the end of a fill period.

Some embodiments of the present invention provide for apparatus and methods for adjusting the security or sensitivity of a currency validator based on inventory of at least one product of a vending machine or other sales device. One exemplary method comprises: determining an amount of inventory of at least one product of a safes device, determining a measurement of demand for the at least one product; determining whether the amount of inventory will sell out within a predetermined period of time (e.g., a fill period for a vending machine) based on the measurement of demand; and based on whether the inventory will sell out within the predetermined period of time, adjusting a level of sensitivity of a currency validator (e.g., a bill validator) of the sales device. In some embodiments, adjusting the level of sensitivity may comprise one or more of: automatically adjusting the level of sensitivity; increasing the level of sensitivity if the amount of inventory will sell out within the predetermined period of time; and decreasing the level of sensitivity if the amount of inventory will not sell out within the predetermined period of time.

Some embodiments of the present invention provide for apparatus and methods for adjusting the security or sensitivity of a currency validator based on characteristics such as demand for at least one product of a vending machine or other sales device. One exemplary method comprises: determining a current amount of at least one product of a sales device; determining a measurement of demand for the at least one product; determining a potential amount of the at least one product based on the current amount and the measurement of demand; and determining whether to adjust a level of sensitivity of a currency validator of the sales device based on the potential amount of the at least one product. Some embodiments may further include one or more of: adjusting the level of sensitivity of the currency validator; increasing the level of sensitivity if the potential amount is less than a predetermined amount; and decreasing the level of sensitivity if the potential amount is greater than a predetermined amount.

Other embodiments of the present invention provide for apparatus and methods for adjusting the security or sensitivity of a currency validator based on characteristics such as the perishability of at least one product of a vending machine or other sales device. For example, if a given product is likely to expire (or will be considered expired) by the end of a predetermined period of time (e.g., within 24 hours), the sensitivity of a currency validator may be adjusted (e.g., decreased). Thus, in some embodiments, a currency validator may be configured to adhere to different security settings for different inventoried products (e.g., requests to purchase product A are met with stricter security settings than requests to purchase product B, which may have a shorter shelf life than product A).

According to some embodiments of the present invention, one transaction device may adjust its currency validator security settings based on data (e.g., instructions, rejection rates or other information, etc.) received from another device (e.g., via a network). Thus, if a first vending machine, for example, recognizes a high incidence of fraud in a given geographical area, it may inform other proximately located machines and/or may instruct such machines to heighten sensitivity. For example, if a first machine determines that more than a predetermined number of presented $20 bills are counterfeit, it may instruct other machines (e.g., via a communications network) to increase security for validation of $20 bills.

In some embodiments, communication among transaction devices may take place via a central controller. In some embodiments, a controller may determine that fraud is occurring with a predetermined frequency in a given area, and may inform one or more vending machines, for example, to increase security. For example, the controller may determine a rate of fraud based on validation information received from one or more vending machines.

In some embodiments of the present invention, a control system may dynamically adjust sensitivity based on whether or not actual sales tend to follow rejection of an item of currency and/or whether or not acceptable currency is presented following rejection of an item of currency. For example, a vending machine may reject a $1 bill presented by a customer (e.g., based on a determination by a bill validator that the bill is unacceptable or suspect) and then accept a subsequently presented $1 bill as valid. If, for example, the second $1 bill is presented by the same customer and/or is presented within a predetermined time period, the control system may decrease sensitivity for bill validation based on one or more stored rules. For instance, one or more stored rules may reflect an assumption that if the same customer presents a bill after an initially presented bill is rejected, the initially presented bill was not counterfeit. Similarly, one or more rules may reflect an assumption that if a bill is presented shortly after the initially-presented bill is rejected, the second bill is the same as the initially-presented bill, or that the second bill is likely being presented by the same customer, and the initially-presented bill is not counterfeit. At least one embodiment of the present invention may generally be described as a method comprising: receiving by a currency acceptor a first item of currency; rejecting the first item of currency based on at least one validation criterion (e.g., a criterion associated with a physical characteristic of the item); after rejecting the first item, receiving a second item of currency; and if the second item of currency is received within a predetermined period of time after the first item of currency is rejected (and/or if the second item of currency is received from the same customer), adjusting the at least one validation criterion.

It should be noted that, in some embodiments, whether two or more items of currency have been presented by the same customer may be determined, at least in part, through use of a motion sensor, an infrared sensor, a thermal sensor, a weight sensor, or other sensor. For example, according to one embodiment, a vending machine may determine, through a sensor, that a customer has entered the proximity of a vending machine. The vending machine may be programmed to conclude that each subsequent presentment of currency is from the same customer until the sensor indicates that no customer is within the proximity of the vending machine.

As stated herein, one benefit of some embodiments of the present invention is an increase in vending machine profits (e.g., per fill period). Applicants have recognized that by adjusting validation settings (e.g., sensitivity) of a currency validator based on, for example, inventory levels, sales velocity, demand information, sales volume, currency rejection rates, time of day, and/or currency presentment rates, the overall profitability of an automated sales device (e.g., vending machine) and other types of sales devices may be increased. Accordingly, in some embodiments, a currency validator may be associated with a current sensitivity level, and the control system will execute one or more inventive methods to determine whether to adjust the sensitivity level in order to maximize expected profits (e.g., by the end of a fill period).

Applicants have also recognized that in some types of situations, the risk of accepting currency that is suspect (e.g., that may fail one or more criteria for validation) may be managed, for example, by taking action(s) toward achieving a sales velocity or volume that sufficiently offsets the potential loss due to fraud, and thus the overall profitability of a vending machine can be increased. Accordingly, in some embodiments, a control system will execute one or more inventive methods to determine which, if any, actions are appropriate in response to receiving suspect currency in order to increase volume, increase velocity, and/or reduce acceptance (or the likelihood of acceptance) of invalid currency as payment.

According to some embodiments, a general process designed to increase the profitability of a sales device is stored in a memory of a currency validator and is executed by a control system (e.g., the processor, RAM, ROM, software, etc.). The control system may be the control system of a vending machine 100, the control system of the currency validator 200, the control system of a peripheral device 355, the control system of a controller 305, the control system of a peripheral controller 360, or a control system of a combination of any or all of these devices.

Generally, from a control system's perspective, one general process may include the steps of: (i) determining whether an action should be taken, based on sales and/or validation information; (ii) if an action should be taken, determining the one or more action types that are appropriate, based on one or more eligibility rules; and (iii) determining, for the one or more eligible action types, one or more specific actions to take. The process may then further comprise outputting one or more messages (e.g., promotion instances, prompts for additional information) and/or adjusting one or more validation settings.

Figure 10:
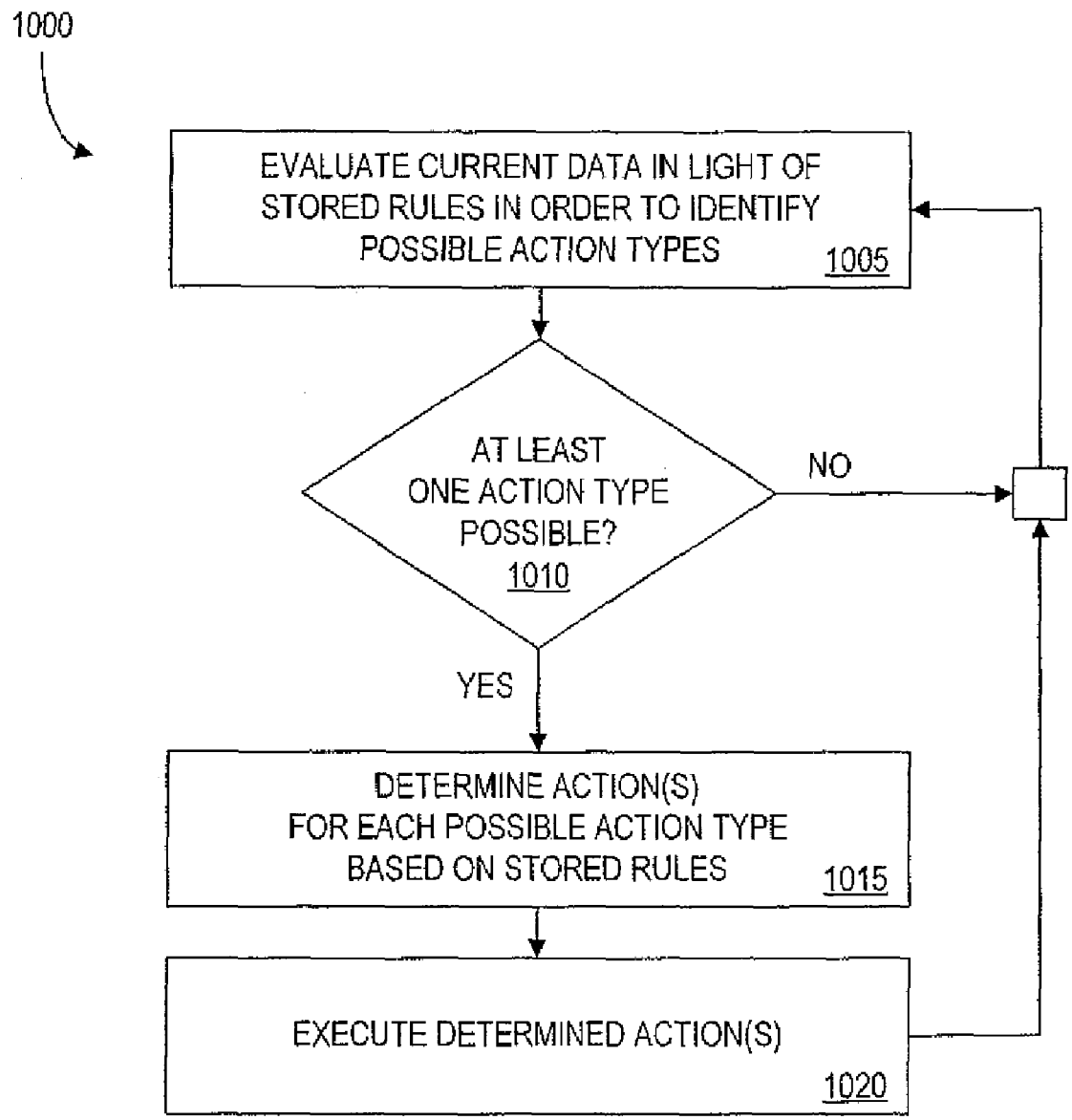
FIG. 10 is a flow diagram illustrating an exemplary process consistent with some embodiments of the present invention.

Referring now to FIG. 10, a flowchart illustrates a process 1000 that is consistent with one or more embodiments of the present invention. The process 1000 is a method for determining an action to be taken by (or with respect to) a vending machine or other type of transaction device (e.g., a slot machine). The process 1000 (or portions thereof, and all other processes described herein unless expressly specified otherwise, may be performed, for example, by a vending machine 100, a peripheral device 355, a controller 305, a peripheral device controller 305, a currency validator 200, another computing device or a combination thereof. Each of these devices is described in detail above. Additionally, while a first device may perform some of the steps of a described process, other steps may be performed by another device or a combination of devices. Further, the process 1000, and all other processes described herein unless expressly specified otherwise, may include steps in addition to those expressly depicted in the Figures or described in the specification without departing from the spirit and scope of the present invention. Similarly, the steps of process 1000 and any other process described herein, unless expressly specified otherwise, may be performed in an order other than depicted in the Figures or described in the specification, as appropriate.

The process 1000 begins at step 1005, in which the control system evaluates current data in light of stored rules to identify eligible action types. Such a determination may comprise, for example, accessing a rules database 235 (e.g., such as illustrated in FIG. 9) and determining whether eligibility conditions associated with one or more action types are satisfied by the current data.

Step 1005 may be performed, for example, periodically, substantially continuously, or in response to a predetermined event. A predetermined event may comprise, for example, an occurrence of a predetermined time (e.g., a predetermined time from a previous performance of step 1005), a presentment (e.g., by a customer or by an operator) of an item of currency (e.g., at a vending machine or currency validator), an addition of a product to a vending machine, a dispensing of a product from a vending machine, a dispensing of coins from a vending machine, an instruction from an operator, a determination that a presented item of currency is suspect, and/or an action of a customer (e.g., an initiation of a transaction, selection of a product and/or a request for a promotion).

According to one embodiment, the process 1000 may be initiated periodically, randomly, upon the occurrence of a predetermined event or substantially continuously. An evaluation of data may be triggered by, for example, a predetermined event such as the occurrence of a predetermined time from a previous evaluation of data, an addition of a product, a dispensing of a product, and/or a dispensing of change. In another example, process 1000 may be triggered by an instruction from an operator. In yet another example, process 1000 may be triggered by input from a customer (e.g., presentment of currency, selection of items for dispensing). Some embodiments of the process 1000 may further comprise one or more steps to determine when or whether to evaluate current data to identify possible action types (e.g., based on the current time).

Many types of data accessible to the control system may be considered in making the determination of which, if any, action types are eligible to be taken. Such data includes, but is not limited to, data made available from (i) machine sensors (e.g., thermometers, etc.) or other peripherals (e.g., bill validators or coin acceptors for determining how much money has been deposited by a customer and/or whether presented currency is valid), and/or (ii) local and/or remote databases (e.g., storing product inventory information, transaction information). For example, the control system may be able to access data indicative of: (1) the time left in a sales period (e.g., 72 hours and 45 minutes to next scheduled restock); (2) current or actual product velocity of one or more products (e.g., average sales of 4 units per day); (3) a number and/or type of currency presentments (e.g., in a particular time period); (4) current and/or available currency validation modes, settings, parameters, ranges, etc.; (5) product attributes, such as (a) the minimum selling price at which item can be sold,
   (b) the full price of a product,
   (c) the marginal cost of the item to the operator of the vending machine,
   (d) a category description of the product (e.g., salty snack, diet beverage, etc.),
   (e) the number of units of the product that are currently available (e.g., the in-stock inventory of the given product),
   (f) an expiration date associated with one or more units;

(6) the total price or cost of a transaction (e.g. the customer has selected three items for a total transaction amount of $3.50); and/or (7) currency attributes (e.g., the ostensible face value of a presented item of currency, for example, $20 or $1).

Thus, according to one embodiment featuring a target product velocity (that is intended to increase profitability by increasing volume despite lower per item profit margins due to promotions), the control system may have access to the actual product velocity of some or all products in inventory. Such information may be stored, for example, in a product inventory database. The control system may determine that based on the actual product velocity, the target product velocity for some or all products will not be reached based on current validation settings, prices, promotions, and the like. Accordingly, the control system may at this point determine that one or more actions should be executed in an effort to reach the target product velocity.

In one embodiment, a basic calendar indicating holidays, school closings, and other periods during which sales may be relatively high or low may be accessible by the control system (e.g., in a database). Thus, the control system may adjust an ideal product velocity to account for such anticipated variations in demand during a sales period.

In one embodiment employing consideration of currency validation information, the control system may determine an appropriate action type, determine an appropriate action of that type, and execute the action based on current validation settings, potential (or available) validation settings, a presented item of currency, and/or validation history information (e.g., validity of items previously presented by a customer, information about regional incidents of fraud). For example, if a currently presented item of currency is suspect (e.g., fails to meet one or more required criteria for acceptance under the current settings of a bill validator), then the control system may determine that validation security is to be increased and process 1000 may continue to step 1010. In another example, if an item of currency is deemed suspect, the control system may determine that the customer should be prompted to provide additional information and process 1000 may continue to step 1010. In another example, the control system may determine that both a modification of validation settings and a prompt for additional information are eligible action types.

In one embodiment employing an ideal or goal product velocity, the control system may determine an appropriate action type, determine an appropriate action of that type, and execute the action based on the difference between the actual product velocity and the ideal product velocity of one or more products. For example, if an actual product velocity for one or more products is greater than or equal to an ideal or goal product velocity for the product(s), then the control system may determine that an increase in the security of validation may be appropriate and process 1000 may continue to step 1010. In another example, if an actual product velocity for all products is less than an ideal product velocity for all products, the control system may determine that the current level of security for currency validation should be maintained and the process 1000 may end. Optionally, the step 1005 may be repeated (e.g., periodically, randomly, according to a schedule) until it is determined that another action should be taken.

In another embodiment employing an ideal product velocity, the control system may determine promotion types, construct and select promotion instances, and output promotions based on the difference between the actual product velocity and the ideal product velocity of one or more products.

At step 1010 it is determined whether at least one action type has been identified as eligible or appropriate (e.g., in step 1005). If it is determined, in step 1010, that no action types are eligible, the process 1000 may return to step 1005. If it is determined, in step 1010, that at least one action type is eligible, the process 1000 may continue to step 1015.

In step 1015 at least one action is determined based on the eligible action type(s) determined in step 1005. It should be noted that if, in step 1010, it is determined that more than one type of action is eligible to be taken, at least one action may be determined for each of the eligible action types in step 1015. Alternatively, in one embodiment, a subset (e.g., one) of the eligible action types may be selected (e.g., based on one or more stored rules) and only the subset of action types may be utilized in determining actions in step 1015. In one embodiment, one or more actions of a particular eligible action type are identified or otherwise determined, and one or more of those identified actions is selected. For example, a particular action may be based on data related to the actions and/or on stored rules (e.g., condition(s) for action 815 in the table 800).

In one embodiment, stored rules may provide for a determination of which action is likely to prevent acceptance of fraudulent currency. For example, an action to increase the security of currency validation may be selected based on consideration of the rate at which fraudulent currency has been detected in a particular geographical area and/or the type(s) or denomination(s) of invalid currency most often received. In one embodiment, stored rules may provide for a determination of which action is likely to reduce, mitigate or offset the potential risk of accepting suspect currency. For example, an action to prompt a customer for additional information may be selected based on consideration of a transaction history associated with the customer and/or a currency validation history associated with a customer. In one embodiment, stored rules may provide for a determination of which action is likely to yield the highest profit margin. For instance, an action to output a promotion or other message may be selected based on considering the rate at which customers have historically accepted such promotion instances when offered.

In some embodiments, selecting an action may include constructing one or more promotion instances and/or selecting one or more constructed promotion instances. In one embodiment, constructing a promotion comprises populating one or more parameters of a promotion type with a value. For example, a parameter of a promotion type may be a product selection. The control system may populate this parameter by selecting one or more products to be the subject of the promotion instance being created and populate this parameter with the product description of the one or more products selected. In another example, a parameter may comprise a price (e.g., a package price or a subscription price, depending on the promotion type serving as the basis for the promotion). In this example, the control system may populate this parameter by determining the price at which the product that is the subject of the promotion is to be offered and inserting this value into the price parameter. The determination of a value to be inserted into a particular parameter of a promotion type may be performed based on one or more rules stored for such a purpose.

Various methods may be employed for determining the projected profitability of several available actions, and selecting one or more actions based on such a determination. For example, a method may be employed that scores any possible actions based on one or more of: (i) profit margin, (ii) likelihood of receiving fraudulent payment, (iii) "take rate" or "response rate" (e.g., of an offer, of a prompt for additional information or alternate currency), (iv) a sales device's currency inventory, (v) available inventory of an item or items, (vi) certain "override" priorities or weights (e.g., certain products or offers may be favored because of business relationships with product manufacturers, etc.), (vii) determined difference between an ideal product velocity for a given item or group of items and the actual product velocity for the item or group of items, and the like.

Returning now to process 1000, at step 1020 the one or more actions selected in step 1015 are taken. For example, the security level of a coin acceptor may be switched to a "High Security" mode, a promotion may be output, and/or a customer may be prompted via an output device to provide a driver's license number, email address or some other identifier. An output device may comprise an output device of, for example, a vending machine, a peripheral device associated with a vending machine, and/or a user device (e.g., a cellular telephone). In another example, an action may be taken such that a promotion (including but not limited to combination promotions, subscription promotions, dynamically priced upsell promotions, fixed price upsell promotions, and alternate product promotions) is output to one or more customers of a vending machine via an output device.

The process 1000 may then return to step 1005. Alternatively, the process 1000 may end. In some embodiments, the process 1000 may be initiated again, for example, when an evaluation of current data is triggered, as described above.

Figure 11:
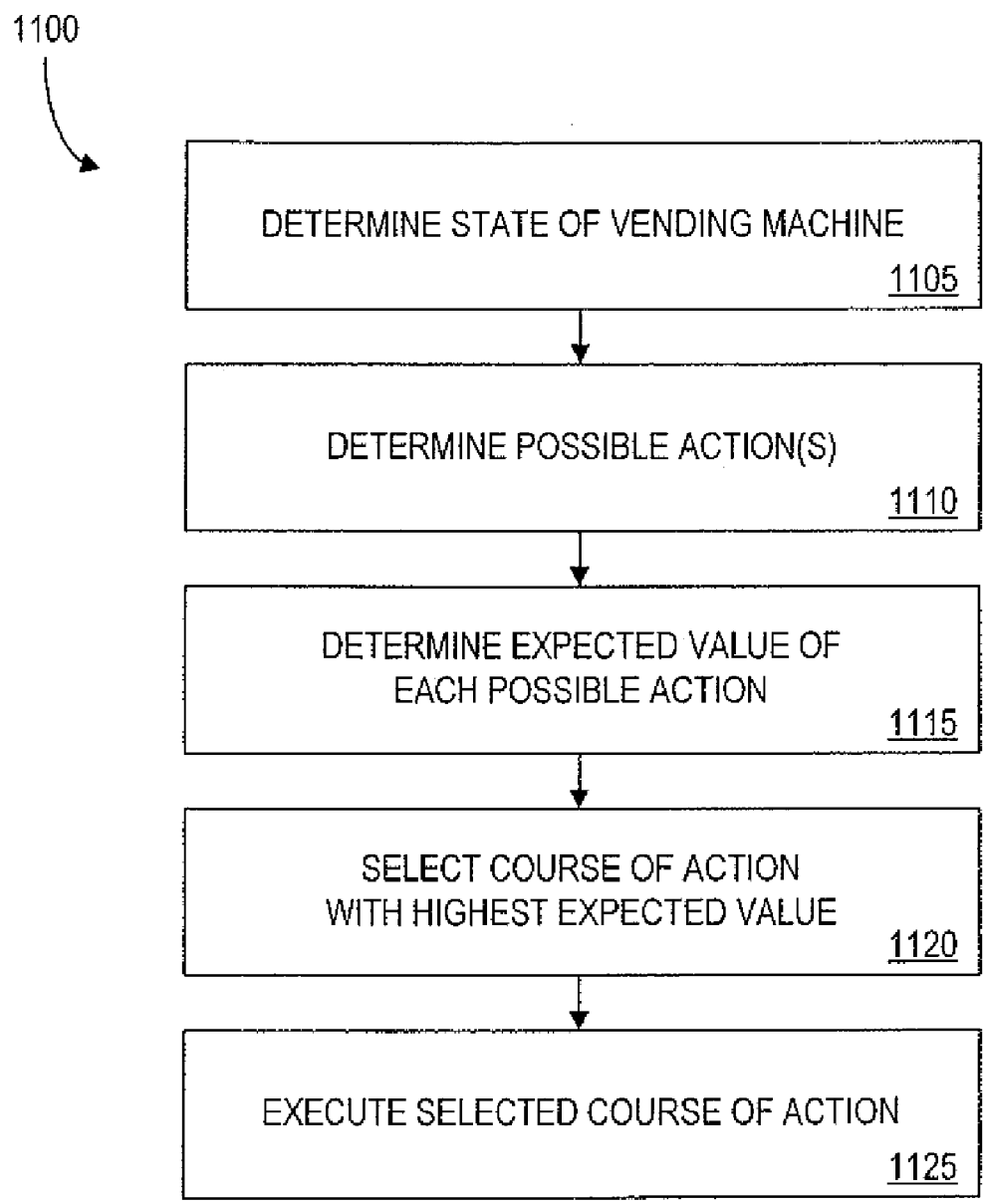
FIG. 11 is a flow diagram illustrating an exemplary process consistent with some embodiments of the present invention.

Referring now to FIG. 11, a flowchart illustrates a process 1100 that is consistent with one or more embodiments of the present invention. The process 1100 is a method for determining an action to be taken by (or with respect to) a vending machine or other type of sales device. As noted above, the process 1100 (or portions thereof) may be performed, for example, by a vending machine 100, a peripheral device 355, a controller 305, a peripheral device controller 305, a currency validator 200, another computing device or a combination thereof. By way of example, the process 100 is described below as being performed for a vending machine.

In one or more embodiments, a vending machine may be regarded as having a number of possible "states." A state may be defined by any one or more factors relevant to overall machine profitability or to some other metric of the vending machine. Examples of such factors include, but are not limited to: (i) a number of each type of product contained within the vending machine; (ii) a number of nickels, dimes, and quarters contained within the vending machine; (iii) a value of all the bills contained within the vending machine; (iv) a time remaining in the fill period; (v) a time of day; (vi) the weather; (vii) the season; (viii) the date; (ix) a rate of unacceptable currency presentations; and (x) a validation mode or setting(s). For example, a first state may correspond to a vending machine that has six Diet Cokes® remaining, nine Cokes®, three orange drinks, seven bags of potato chips, twelve Snicker's® bars, $427.85 in currency, has bill and coin validators set at High Security, and has seventy-two hours remaining in the fill period.

At step 1105, a state of the vending machine is determined. In some embodiments, the determined state may reflect the current or active state of the vending machine. In some embodiments, the determined state may correspond to a state other than the current state. For example, the determined state may be a previous state, a predetermined state, or a hypothetical future state. In some embodiments, more than one state may be determined. For example, two or more alternative states may be determined for use in determining which state may be more desirable, as discussed further below.

At step 1110, possible courses of action are determined. In some embodiments, an action may correspond to a transition from one state (e.g., a current state) to another. In some embodiments, step 1110 may include determining what actions may be necessary to transition the vending machine from one state to another.

In some embodiments, step 1110 may comprise determining whether currency validation security is to be adjusted and/or whether a promotion or other message is to be output (e.g., to a customer). Step 1110 may further comprise determining the type of validation adjustment(s) and/or message(s). In step 1115 an expected value is determined for each course of action determined in step 1110. In one embodiment, each of these possibilities has an associated expected value, and the control system determines which of the possibilities to choose in order to yield the maximum expected value. Some examples of apparatus and methods for determining the expected value of various actions and/or states suitable with one or more embodiments of the present invention are described herein and in U.S. patent application Ser. No. 10/855,247, and incorporated by reference herein.

In step 1125, the possible course of action with the highest expected value is selected. In step 1130, the course of action selected in step 1125 is executed. This may comprise, for example, outputting a selected promotion (if the selected course of action includes outputting a promotion), adjusting one or more security settings for currency validation, rejecting a presented item of currency, accepting a presented item of currency (e.g., even if the item failed an initial validation process), outputting a prompt for additional information, receiving information and/or an alternative item of currency or other means of payment, and/or processing a transaction.

In some embodiments, security for a currency validator may be adjusted based on potential sales (e.g., for a fill period). For example, determining whether to adjust security of a bill validator and/or determining what validation settings to use for a bill validator may include calculating and comparing potential sales corresponding to respective security settings. In one embodiment, a method comprises: determining a first level of security for a currency validator; determining a first amount of potential sales based on the first level of security; determining a second level of security for the currency validator; determining a second amount of potential sales based on the second level of security; and selecting one of the first level and second level based on the first amount of potential sales and the second amount of potential sales. For example, the first level of security may be the current level of security of a bill validator, and the second level of security may be a different (more or less secure) setting available for the bill validator. In one embodiment, the level yielding the higher expected total margin would be selected (at step 1120) and the security of the bill validator would be adjusted to the selected level (at step 1125).

Figure 12:
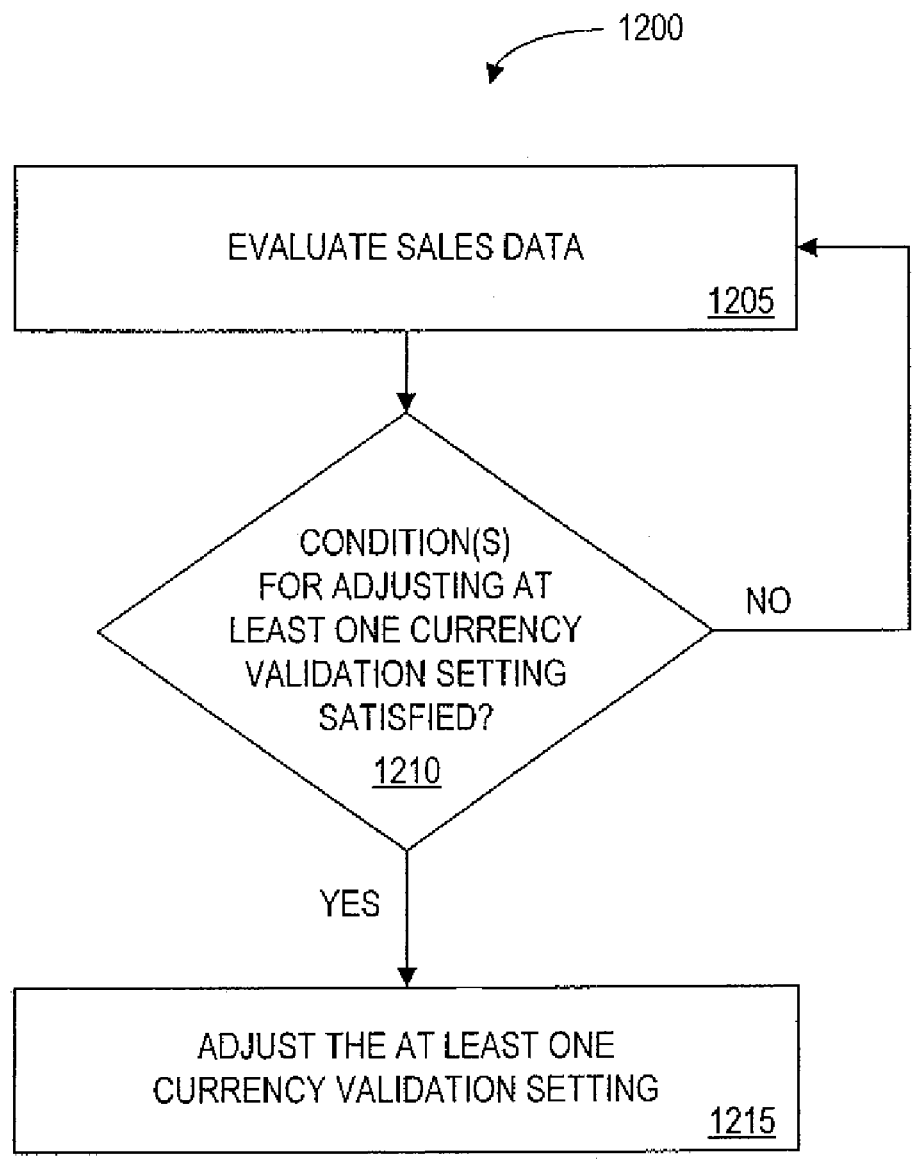
FIG. 12 is a flow diagram illustrating an exemplary process consistent with some embodiments of the present invention.

As stated above, in one or more embodiments, a device (e.g., a vending machine 100, a currency validator 200, a peripheral device 355, a controller 305, a peripheral device controller 360, or a combination thereof) may determine an action to adjust validation security. FIG. 12 illustrates a flow diagram of an exemplary process 1200 in accordance with such an embodiment.

Process 1200 begins with step 1205, in which sales data is evaluated. For example, a currency validator 200 or vending machine 100 may evaluate various types of current and/or historical sales data, including information related to inventory, product demand, target measures of performance (e.g., a target product velocity), marketing, pricing, offers and other promotions, transactions, customers, etc.

In some embodiments, information about currency validation (e.g., stored in validation history database 225 and/or validation settings database 220) may be evaluated in addition to or instead of sales information. Further, in some embodiments, information about presented currency (e.g., whether a currently presented bill appears to be a $20 bill or a $5 bill) may be evaluated in addition to or instead of sales information.

In some embodiments a currency validator may receive information about product inventory or transaction history from a control system of a vending machine or peripheral device. For example, a currency validator may send a request to a vending machine for information about target and actual product velocity, and the vending machine may determine the requested information (e.g., by querying a product inventory database 120 and/or transaction history database 130) and transmit the data back to the currency validator. In other embodiments, a currency validator may store sales data (in addition to or in lieu of having such information stored at another device).

In at least one embodiment, information about a user may be determined, such as, for example, how many times the user has used the sales device, or whether the user has ever provided fraudulent currency. For example, information related to a customer may be stored in a customer database in association with a customer identifier. Such information may be useful in determining whether and/or how to adjust validation security. In some embodiments, if a user of a sales device (e.g., a player at a slot machine) is recognized by the control system (e.g., the player provides a valid player tracking card, the player is a hotel guest), security of a currency validator may be decreased. In another embodiment, if a customer is not recognized (e.g., by a vending machine), security may be increased (e.g., to a more secure mode).

In some embodiments, information about a customer is received. For example, a player may insert a player tracking card at a slot machine, or otherwise identify himself to the slot machine and/or to a controller (e.g., a network server) in communication with the slot machine. In another example, a customer at a vending machine may input identifying information.

At step 1210 it is determined whether any condition(s) for adjusting security for currency validation has been satisfied. For example, referring to table 800 (embodiment 800 of an actions database 230), a control system (e.g., of a currency validator, vending machine, or other device) may determine whether the condition(s) 815 of any record of the table 800 is satisfied by the determined data. Thus, in some embodiments of the present invention, an action for adjusting security for currency validation may be determined at least in part by selecting a predetermined action from a set of available actions. In some embodiments, an action type (e.g., to increase or decrease security) may be determined in addition to or in lieu of selecting a pre-determined action. For example, as discussed herein, an action type may be determined in accordance with one or more stored rules (e.g., rules database 235). After an action type is determined, one or more corresponding actions of that type may be selected, for example, based on one or more stored conditions (e.g., condition(s) for action 815 of exemplary table 800). Step 1210 may be performed substantially continuously, periodically, in response to a predetermined event, or otherwise as appropriate.

If it is determined in step 1210 that any condition(s) for adjusting at least one currency validation setting has been satisfied (e.g., an action of action type 810 "INCREASE SECURITY" or "DECREASE SECURITY"), any action corresponding to the satisfied condition(s) is performed in step 1215. For example, referring again to table 800, if it is determined that the net profit for a current fill period for a vending machine is less than $70, then action "A-80-662" may be performed to increase the acceptable parameter ranges for all bill denominations. In one example, this may include changing the security mode for a bill validator from a higher security mode to a lower security mode. In another example, this may include increasing the tolerance of a bill validator for any of various types of measured characteristics used to identify valid and/or acceptable currency, as discussed herein.

In one embodiment, where information about presented currency is evaluated (in addition to or instead of sales information) at step 1205, a bill validator's security setting may be adjusted based on the ostensible face value of the currency presented. For example, it may be determined, at step 1210, that a customer has tendered a bill appearing to be a $20 bill, thus satisfying a condition requisite to set the bill validator's security setting to "high." In another example, had the customer presented a $1 bill, a condition may have been satisfied such that the bill validator's security setting would be set to "low." In some embodiments, seemingly high value currency items may receive stricter scrutiny (e.g., from a currency validator) than relatively low value currency items.

Figure 13:
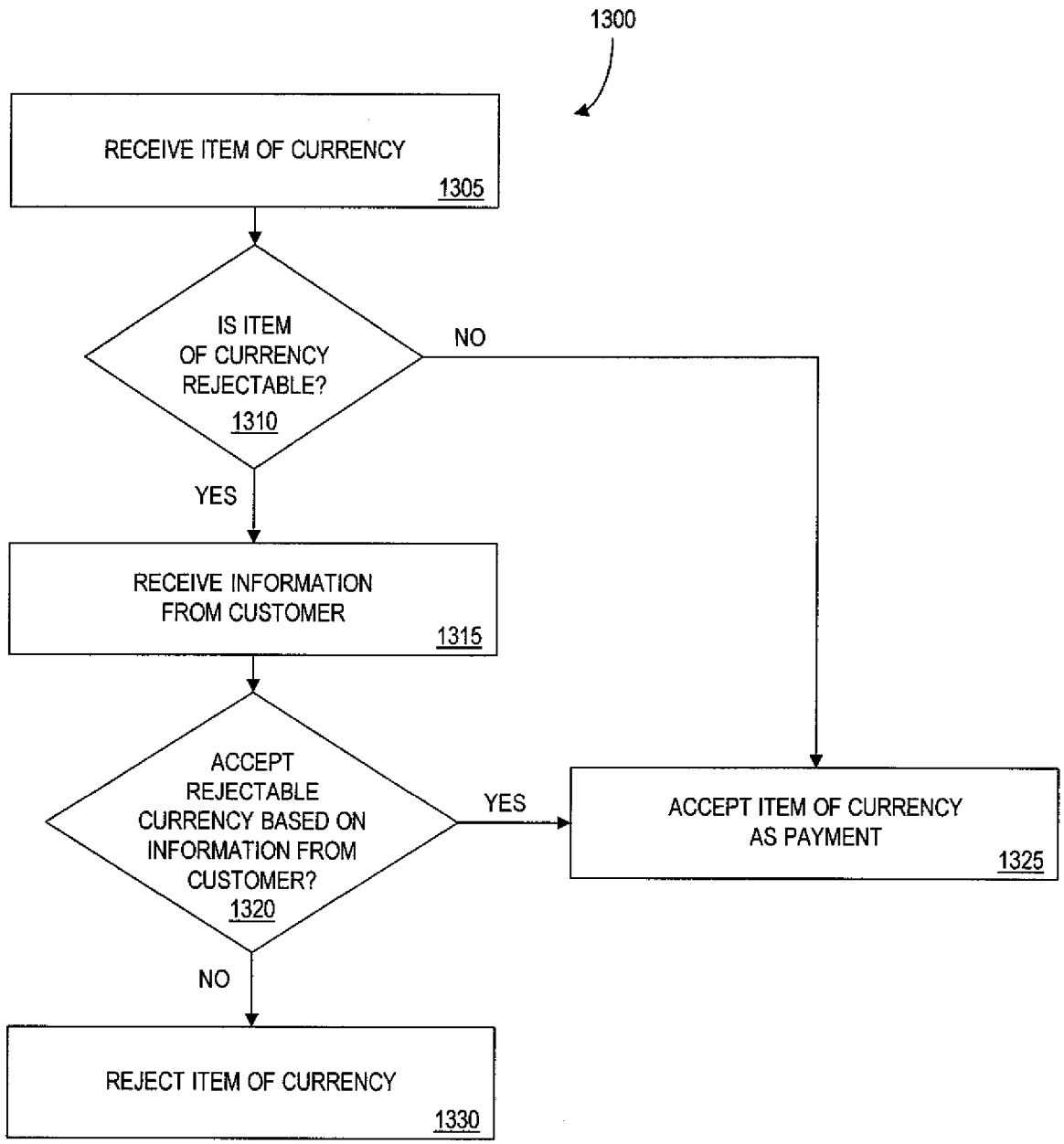
FIG. 13 is a flow diagram illustrating an exemplary process consistent with some embodiments of the present invention.

Referring now to FIG. 13, a flowchart illustrates a process 1300 that is consistent with one or more embodiments of the present invention. The process 1300 is a method for determining an action to be taken after an item of currency is received (e.g., by a currency validator, slot machine, or vending machine) that is rejectable. The process 1300 (or portions thereof), and all other processes described herein unless expressly specified otherwise, may be performed, for example, by a vending machine 100, a peripheral device 355, a controller 305, a peripheral device controller 305, a currency validator 200, another computing device or a combination thereof.

At step 1305, an item of currency is received. For example, a bill validator may recognize (e.g., via an optical sensor) that a bill has been inserted in the bill validator (e.g., by a customer at a vending machine).

At step 1310, it is determined whether the item of currency is rejectable. Such a determination may include a currency validator measuring one or more of various characteristics of the item of currency and comparing such measurements to predetermined criteria for acceptance. For example, a bill validator may optically scan an inserted bill and compare detected information (e.g., color, visual markings) with stored information (e.g., expected markings at particular locations) to determine whether the bill should be accepted or rejected based on the determined information about the bill.

In some embodiments, a currency item may be determined to be rejectable at least in part because a denomination of the item of currency cannot be determined. For example, a received coin may not meet all of the required criteria for any of the coin types programmed as acceptable by a coin acceptor, and the coin's denomination may not be identifiable otherwise. In other embodiments, a probable denomination or face value of the item may be identifiable or otherwise determinable (e.g., a "20" may appear in the location expected for a valid $20 bill; a bill may meet all but one (or some other predetermined number) of the validation criteria for a $5 bill) but a currency validator may find the item rejectable for one or more other reasons (e.g., the expected color or opacity of the bill is not within an acceptable range).

In some embodiments, determining whether an item of currency is rejectable may comprise a currency validator executing one or more validation processes or algorithms, as will be readily understood by those skilled in the art. In some embodiments, step 1310 may include a control system (e.g., of a vending machine) receiving a signal or data from a device (e.g., a currency validator, a peripheral device, a controller) indicating that a received item of currency is rejectable.

If it is determined in step 1310 that the received item of currency is rejectable, then the process continues to step 1315, in which information is received from a customer. In some embodiments, as discussed herein, a customer may provide information, for example, to a vending machine, currency validator, or peripheral device. In some embodiments, the information provided may be in response to a prompt to the customer to provide such information. In one example, a customer may be prompted to provide information about an alternative means of payment, such as a credit card number, a debit account number, or some other type of identifier that identifies a financial account. Such information may be used, in accordance with some embodiments, to charge the value of a transaction to the customer if it turns out that a received currency item is actually invalid or fraudulent.

In another example, a customer may be prompted to provide information that identifies the customer, such as a driver's license number, social security number, telephone number, email address, or postal address. Such information may be used, in accordance with some embodiments, to identify, locate, and/or communicate with a customer (e.g., to bill the customer for a transaction at a vending machine) should the received currency actually be invalid.

As discussed herein, some embodiments of the present invention may include presenting a promotion or other type of offer to a customer. Thus, information received from a customer may comprise an indication of a response (e.g., acceptance or rejection) of the customer to a promotion output to the customer. For example, a customer may be presented with a promotion for an alternate product offer after providing what appears to be a suspect $1 bill. For instance, the offer may be to switch a selected product with a lower profit margin for a product of the same retail price and a relatively higher profit margin. In this way, the control system of the currency validator or vending machine may attempt to reduce or mitigate the potential loss (in terms of inventory value) should the rejectable $1 bill actually be fraudulent.

In some embodiments, the information received from the customer is received, as discussed above, in response to a prompt while the customer is attempting to conduct a transaction with a sales device. In some embodiments, the information received from the customer may comprise information (e.g., a credit card account number, a postal address) received at some time other than during a current transaction. For example, a customer may be a repeat customer who provided a credit card number to the control system during a previous transaction. In another example, a customer may have previously registered with a controller via a website (e.g., in order to establish a prepaid account for vending machine transactions) and provided some identification and/or financial information at that time.

In step 1320, it is determined whether the rejectable item of currency should be accepted as payment based on the information received from the customer. For example, if the customer has provided a driver's license number or credit card number (e.g., in response to a prompt from a vending machine), a control system may determine (e.g., in accordance with one or more stored rules) to accept the rejectable currency as payment. In some embodiments, a control system may attempt to verify any identification or financial information provided (e.g., through a query of a local or remote database) and may accept the currency as payment based on whether the information could be verified. In another example, a control system may accept the rejectable currency if the customer accepts an offer.

If it is determined not to accept the rejectable currency as payment, the process proceeds to step 1330, where the item of currency is rejected and the process ends. Rejecting the currency may comprise, for example, displaying a message to the customer that the currency will not be accepted as payment, returning the currency (e.g., via a coin return path), and/or transmitting a signal from one device to another indicating that the item of currency is or should be rejected (e.g., a bill validator transmitting a code to a vending machine controller indicating that a bill has been rejected; a processor of a bill validator transmitting a signal to a bill return mechanism to return a rejected bill). In some embodiments, information indicating that an item of currency is rejected may be stored in a database (e.g., validation history database 225). Other ways of rejecting currency will be readily understood by those skilled in the art.

If it is determined in step 1320 that a rejectable item of currency should be accepted as payment, or it is determined in step 1310 that the item of currency is not rejectable, in step 1325 the received item of currency is accepted as payment and the process ends. For example, the value of the currency may be credited at a transaction device (e.g., as an account deposit at an ATM, to establish a credit balance at a slot machine). In another example, the currency may be accepted as payment for a purchase of one or more items at a vending machine or other type of sales device. Various ways of accepting currency as payment will be readily understood by those skilled in the art. In some embodiments, accepting the item of currency as payment may include a currency validator transmitting a signal to a vending machine or other device indicating the value of the currency.

In one example of the process 1300, a sales device may provide for conditional acceptance of cash currency. For example, a vending machine may accept suspect currency (e.g., a bill that should be rejected according to security settings) on the condition that a customer provides another payment means that may be accessed should the currency prove counterfeit. For instance, if a vending machine receives a $20 bill that appears to be fraudulent, the vending machine may output instructions to the customer to swipe his credit card or enter the credit card number using a touch screen. In this way, the vending machine can accept the $20 bill for use in a transaction and the owner/operator of the vending is provided with the recourse of charging the customer's credit card if the $20 bill ultimately proves counterfeit. In another example, as discussed above, a sales device may accept suspect currency if the customer presents a valid form of identification (e.g., a driver's license, a player tracking card, etc.).

In some alternative embodiments, sales information (e.g., product inventory information, promotion information, demand information, and/or transaction history information) may be received in step 1315 in addition to or in lieu of information from a customer. Accordingly, determining whether to accept a rejectable item of currency in step 1320 may include determining based on sales information in addition to or in lieu of information received from a customer.

Although the process 1300 is described with respect to determining whether a received item of currency is rejectable, some alternative embodiments of the present invention may include determining whether an item of currency is suspect, invalid, and/or likely invalid.

As discussed herein, one or more offers may be output after a suspect item of currency is received. According to at least one embodiment of the present invention, methods and apparatus may be provided for receiving an item of currency from a customer; determining that the item of currency fails at least one condition for acceptance; and in response to determining that the item of currency fails the at least one condition for acceptance, presenting an offer for a product to the customer. For example, after receiving a suspect item of currency, a vending machine may offer for sale only those products with profit margins not less than a predetermined minimum.

E. ADDITIONAL EMBODIMENTS

According to some embodiments of the present invention, a customer may be assessed a risk premium if the customer presents suspect currency. The risk premium may compensate the operator of a sales device for the risk of accepting the suspect currency. The customer may or may not know that a risk premium is being assessed. Thus, some embodiments of the present invention may comprise determining (e.g., based on whether an item of currency is suspect) whether a risk premium should be assessed and/or determining what a risk premium should be.

A risk premium may take any of various forms. In one example, risk premium may comprise an additional charge or surcharge to the customer. For instance, a customer may be required to deposit additional currency (e.g., $0.05) or otherwise provide a premium amount. In one embodiment, the customer may be prompted by a message from a vending machine or currency validator to insert additional currency. In another embodiment, assessing a premium to a customer may include adding a surcharge amount to a price of at least one product (or to a purchase amount for a plurality of products). In one embodiment, a control system may receive an indication that the customer is willing to provide a premium and in response may accept a suspect item of currency.

According to some embodiments, a process involving suspect currency may comprise denying a customer promotional opportunities and/or purchase opportunities. For instance, the customer simply may not get any upsell offers, or one or more types of offers may be disabled. In another example, a customer may be eligible to receive a lesser number of promotional opportunities than if the presented currency were not suspect, or may be eligible to receive different types of promotions (e.g., different upsell selections) because the currency is suspect.

In one embodiment involving a premium, a general process may include determining at least one offer; and preventing presentation of the at least one determined offer to the customer. In another embodiment of the present invention, a general method for use in response to determining that presented currency is suspect may comprise determining a set of at least one upsell offer (e.g., for use where currency is suspect); selecting at least one upsell offer from the set; and presenting the selected at least one upsell offer to a customer.

In some embodiments, a customer may not be allowed to purchase one or more products or types of products because the currency is suspect. For instance, low margin snack products may be disabled if the currency is suspect (e.g., by changing the corresponding status 555 of the product inventory database 120 to "DISABLE"). In another example in which a customer may select one or more products that are assigned to one or more inventory groupings (e.g., for purposes of promotion), the risk premium may mean that a customer may get different inventory groupings in promotion settings than he would if the currency were not suspect. For instance, if currency is suspect, all chips and candy bars may be categorized only as "RED" items, but if currency is not suspect chips are categorized as both "RED" and "GREEN," while candy bars are only "RED." International Patent Application Serial No. PCT/US2004/025497 is incorporated by reference herein and includes, among other things, some examples of apparatus and methods that may be suitable with one or more embodiments of the present invention for grouping items for sale.

In some embodiments of the present invention, a sales device may attempt to switch a customer to make a purchase for a different denomination of currency and/or different type of currency (e.g., different than currency initially presented by the customer). Some embodiments of the present invention may comprise transmitting to a customer an offer to provide at least one benefit in exchange for receiving an alternative means of payment from the customer. For example, as indicated in exemplary tables 800 and 900 of the actions database 230 and rules database 235, respectively, a customer may be prompted to input a different currency item. In another example, a customer may be offered a discount on a purchase if she pays with coins instead of bills. In another example, a customer may be given an upsell offer that encourages him to present a higher value denomination (e.g., 12 units for $5 instead of 2 for a presented $1 bill). In accordance with some embodiments of the present invention, a process involving receipt of a suspect item of currency may include one or more of the following steps: receiving a first item of currency from a customer; determining that the first item of currency fails at least one condition for acceptance or validation criterion; determining at least one benefit for the customer; receiving a second item of currency from the customer for use in place of the first item of currency; and providing the at least one benefit to the customer in exchange for receiving the second item of currency. For example, as discussed above, the benefit may include a discount off of one or more transactions, a product, or an upsell offer.

According to some embodiments, if a player at a slot machine provides currency that is suspect the player may be allowed to wager the value of the suspect currency (e.g., if it can be determined or estimated) to play one or more games. However, in one embodiment, one or more outcomes (e.g., video poker hands, reel spins) may be locked, hidden, or otherwise not revealed to the player. In another embodiment outcomes may be communicated to the player, but any associated payout(s) are not provided to the player. For example, a slot machine may indicate that a payout of ten credits has occurred, but the ten credits are not added to the player's available credit balance. Thus, outcomes and/or payouts may be held in response to receiving suspect currency. In order to unlock outcomes and/or receive held payouts, the player may be required, for example, to provide an alternate form of payment (e.g., at the slot machine, at a service desk), provide additional information about the player (e.g., a drivers license number, a social security number), accept one or more offers (e.g., a hotel stay, a player tracking card, a prepaid gaming session), etc.

According to one embodiment of the present invention, an action to obtain additional information from a customer may comprise requesting that the customer present an image of the customer, such as a photograph of the customer or a card (e.g., a driver's license or other photo ID) including an image of the customer. In one embodiment, a transaction device may include an imaging device, such as a video or still camera, and may capture an image of the customer. In one embodiment, an image of the customer may be affixed to a received item of currency.

According to one embodiment of the present invention, currency that is determined to be suspect or rejectable may be stored separately from currency that is not suspect. For example, a currency validator may comprise one storage box for suspect currency and another storage box for currency that is not suspect. Some embodiments of the present invention may comprise determining in which of a plurality of storage means to store a received item of currency, based on whether the currency is suspect or rejectable.

According to some embodiments of the present invention, a transaction device may determine a value of an item of currency that is suspect or rejectable. The determined value may be expressed, for example, as a monetary value, an amount of credit, a number of products (e.g., a customer may be allowed to select any two products in exchange for the suspect currency), and/or one or more specific products or categories of products. The determined value may or may not be equal to an ostensible or face value of the item of currency.

According to one or more embodiments of the present invention, a transaction device determines that an item of currency received from a customer is suspect or rejectable. The transaction device determines a value to credit to the customer based on the item of currency (e.g., to determine a credit balance in a vending machine or slot machine which the customer may use to purchase goods or services). The value may be more than or less than a determined face value of the currency. The determined value may correspond to a discount off of a face value of the currency. Determining the value to credit may include determining a face value of the currency, determining a likelihood that the currency is invalid, determining information about the customer, determining information about a status of the transaction device, and/or determining sales information. In one example, a transaction device may transmit to a customer an offer to accept suspect currency at a value discounted from the face value of the suspect currency. For instance, a vending machine receiving a suspect $5 bill may credit the customer with only $4.

In some embodiments, one or more components of a currency validator may be remote from one another. According to some embodiments, one or more aspects of the present invention may be performed remotely from where an item of currency is received. For example, characteristics of a bill inserted by a customer at a vending machine may be detected by sensors of a currency validator integrated with the vending machine. The detected information may then be transmitted (e.g., via the Internet) to a remote computing device and/or to a remote person for evaluation. In some embodiments, therefore, the currency validator may be described as comprising one or more remote components. In one example, a digital image is taken of a bill or coin received at a transaction device and the image is transmitted to a computing device operated by a remote agent, who may be in a different city, state or country than the transaction device. The remote operator views the image data, makes a determination as to whether the currency is valid, and transmits an indication of the determination to the transaction device. Of course, various other functions described herein as performed by various devices may be performed by one or more people, remotely or locally. For instance, a remote agent or operator may make determinations as to which actions to take (e.g., whether to increase or decrease security, whether to restrict the offers available to a customer, whether to accept rejectable currency, etc.) based on information received from a transaction device.

According to some embodiments of the present invention, a customer may be associated (e.g., in a customer database) with one or more credit balances or other types of accounts. For example, a customer may be able to establish a balance of credits redeemable for a determined number of products and/or having a monetary value. In one embodiment, the credit value of suspect currency may be not used until the validity of the currency is confirmed (e.g., by a route operator). For example, a customer who provides a suspect $5 bill may have $5 worth of credit put on hold or otherwise indicated as being unavailable for purchases. For instance, an indication of the value of the suspect currency may be stored in association with the customer, but the customer may not use the frozen credit until the validity of the provided currency is confirmed. Once the validity is confirmed, the credits may be released and used for purchases. For example, verified credits may be added to a balance of available credits. In some embodiments, separate balances may be used to indicate available credits and provisional or frozen credits.

What is claimed is:

1. A gaming device system including at least one gaming device having a normal operating mode, comprising:
a currency acceptance device operatively associated with the gaming device, the currency acceptance device configured to determine the presence of a risk of the tendered currency being counterfeit; and
a controller operatively associated with said gaming device and said currency acceptance device to receive data from each, and operable such that in the event that tendered currency is determined by the currency acceptance device to present some risk of being counterfeit, to change the mode of operation of the gaming device from the normal operating mode to a second mode which mitigates the risk of the tendered currency being counterfeit,
wherein the second mode of operation comprises preventing payouts of credits unless at least one condition is met and wherein the at least one condition comprises one or more of: (i) a presentation of a user identifier; (ii) a presentation by the user of an alternate form of payment in the event that the tendered currency is counterfeit; and (iii) acceptance of an offer selected to mitigate the risk.

2. A method of operating a gaming system comprising at least one gaming device and at least one currency acceptance device associated with the gaming device, comprising the acts of:
receiving a tender of currency payment at the currency acceptance device;
examining the tendered currency and determining a risk that the currency is counterfeit;
altering an operational mode of the gaming device in a manner to mitigate the risk of the currency being counterfeit, wherein the operational mode of the gaming device is altered to change gaming outcomes that may result from playing the gaming device.

3. The method of claim 2, wherein the gaming outcomes are altered to preclude certain game attributes from occurring.

4. The method of claim 3, wherein the gaming device is a video poker machine, and wherein the precluded game attributes comprise selected poker hands.

5. The method of claim 3, wherein the gaming device is a slot machine, and wherein the precluded game attributes comprise selected reel spins.

6. The method of claim 2, wherein the operational mode of the gaming device is further altered to change the conditions for payout of credits on the gaming device.

7. A gaming device system including at least one gaming device having a normal operating mode, comprising:
   a currency acceptance device operatively associated with the gaming device, the currency acceptance device configured to determine the presence of a risk of the tendered currency being counterfeit; and
   a controller operatively associated with said gaming device and said currency acceptance device to receive data from each, and operable such that in the event that tendered currency is determined by the currency acceptance device to present some risk of being counterfeit, to change a gaming mode of the gaming device from a normal gaming mode to a second gaming mode which mitigates the risk of the tendered currency being counterfeit.

* * * * *